(12) United States Patent
Hakko et al.

(10) Patent No.: US 7,295,378 B2
(45) Date of Patent: Nov. 13, 2007

(54) ZOOM OPTICAL SYSTEM

(75) Inventors: Manabu Hakko, Utsunomiya (JP); Koshi Hatakeyama, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 150 days.

(21) Appl. No.: 11/220,736

(22) Filed: Sep. 6, 2005

(65) Prior Publication Data

US 2006/0056051 A1 Mar. 16, 2006

(30) Foreign Application Priority Data

Sep. 8, 2004 (JP) .............................. 2004-261716

(51) Int. Cl.
*G02B 15/14* (2006.01)

(52) U.S. Cl. ...................... 359/651; 359/649; 359/686; 359/689; 359/715; 359/716; 359/740; 359/772; 359/792

(58) Field of Classification Search ................ 359/686, 359/689, 715, 716, 740, 772, 792, 649–651
See application file for complete search history.

(56) References Cited

U.S. PATENT DOCUMENTS

| | | | | |
|---|---|---|---|---|
| 5,015,077 A * | 5/1991 | Ueda | ........................... | 359/689 |
| 5,825,560 A | 10/1998 | Ogura et al. | ................ | 359/822 |
| 5,847,887 A | 12/1998 | Ogura et al. | ................ | 359/822 |
| 6,021,004 A | 2/2000 | Sekita et al. | ................ | 359/676 |
| 6,166,866 A | 12/2000 | Kimura et al. | ............... | 359/729 |
| 6,292,309 B1 | 9/2001 | Sekita et al. | ................ | 359/729 |
| 6,366,411 B1 | 4/2002 | Kimura et al. | ............... | 359/729 |
| 6,522,475 B2 | 2/2003 | Akiyama et al. | ........... | 359/676 |
| 6,775,071 B1 * | 8/2004 | Suzuki et al. | ................ | 359/686 |
| 6,785,055 B2 * | 8/2004 | Nishikawa et al. | ......... | 359/681 |
| 6,822,806 B2 * | 11/2004 | Suzuki et al. | ................ | 359/686 |
| 7,016,118 B2 * | 3/2006 | Wada | .......................... | 359/680 |

FOREIGN PATENT DOCUMENTS

| | | |
|---|---|---|
| JP | 08-292371 | 11/1996 |
| JP | 08-292372 | 11/1996 |
| JP | 09-005650 | 1/1997 |
| JP | 09-222561 | 8/1997 |
| JP | 2002-055279 | 2/2002 |
| JP | 2002-207167 | 7/2002 |

* cited by examiner

*Primary Examiner*—Evelyn A. Lester
(74) *Attorney, Agent, or Firm*—Morgan & Finnegan LLP

(57) ABSTRACT

A zoom optical system, in order from a reduction side to a magnification side, includes a first lens unit having positive optical power, a second lens unit having the positive optical power, a third lens unit having negative optical power, and a fourth lens unit having the positive optical power, wherein respective intervals between the first, second, third and fourth lens units change during zooming, a conjugate position on the magnification side with respect to a conjugate position on the reduction side, and a position of a pupil of the zoom optical system with respect to the conjugate position on the reduction side, are substantially fixed over an entire zooming range, and during zooming from a wide angle end to a telephoto end, the fourth lens unit moves toward the magnification side, and an interval between the first lens unit and the fourth lens unit increases.

28 Claims, 14 Drawing Sheets

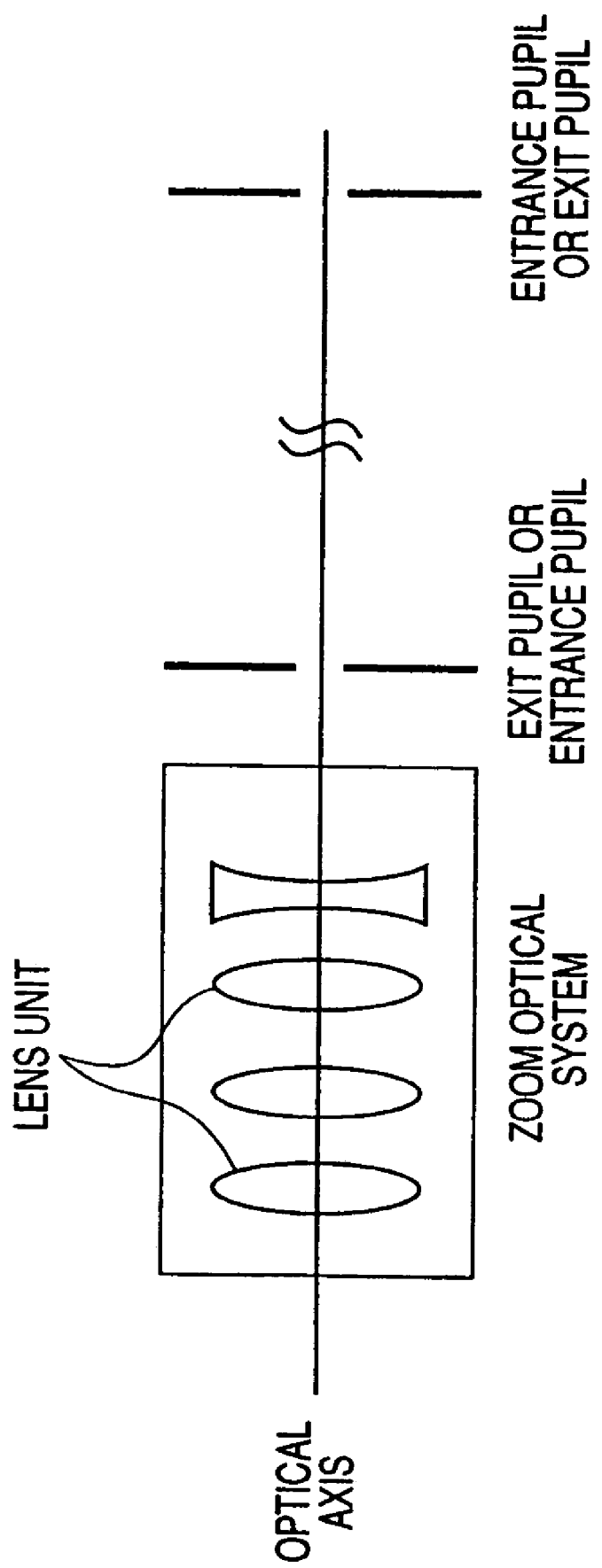

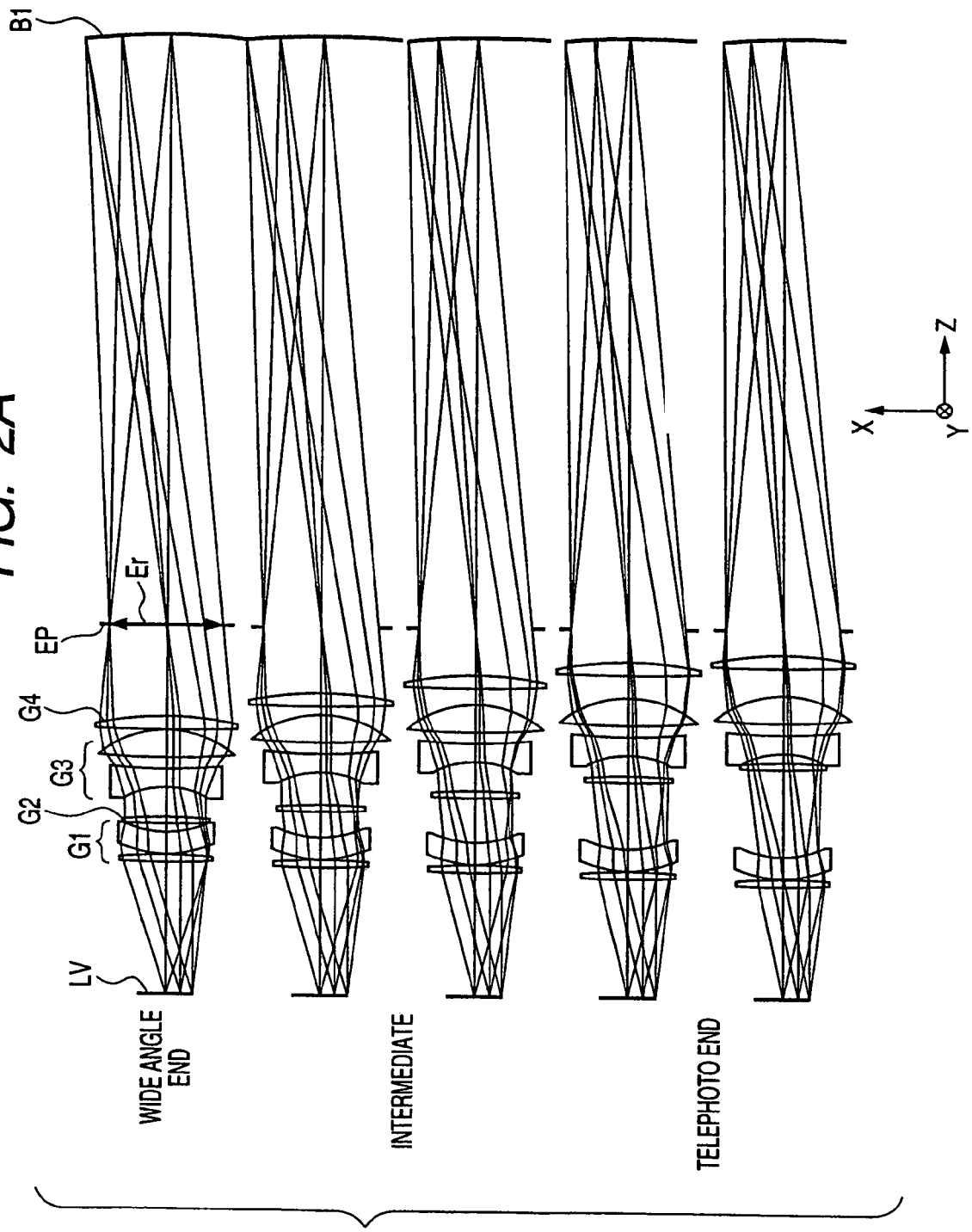

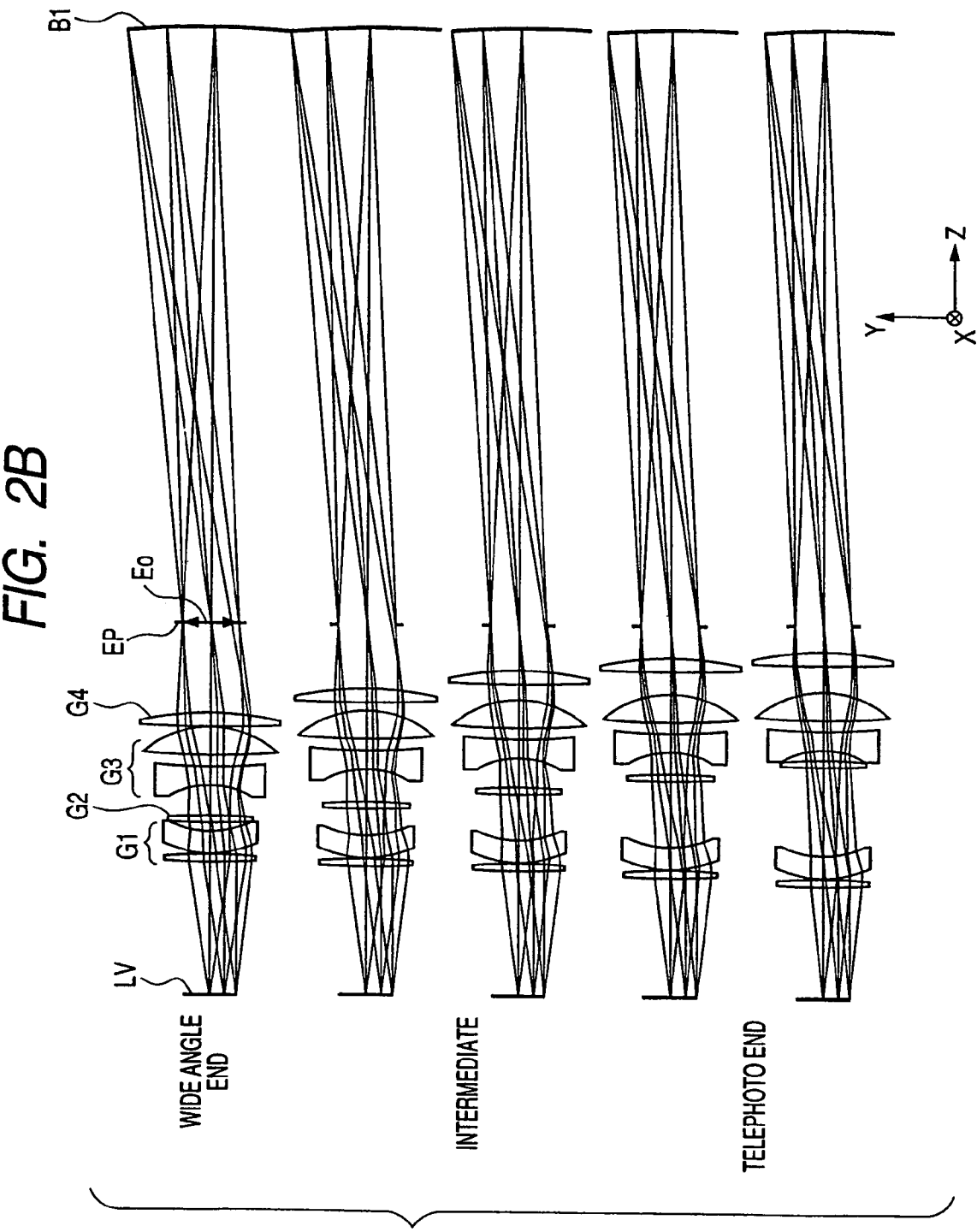

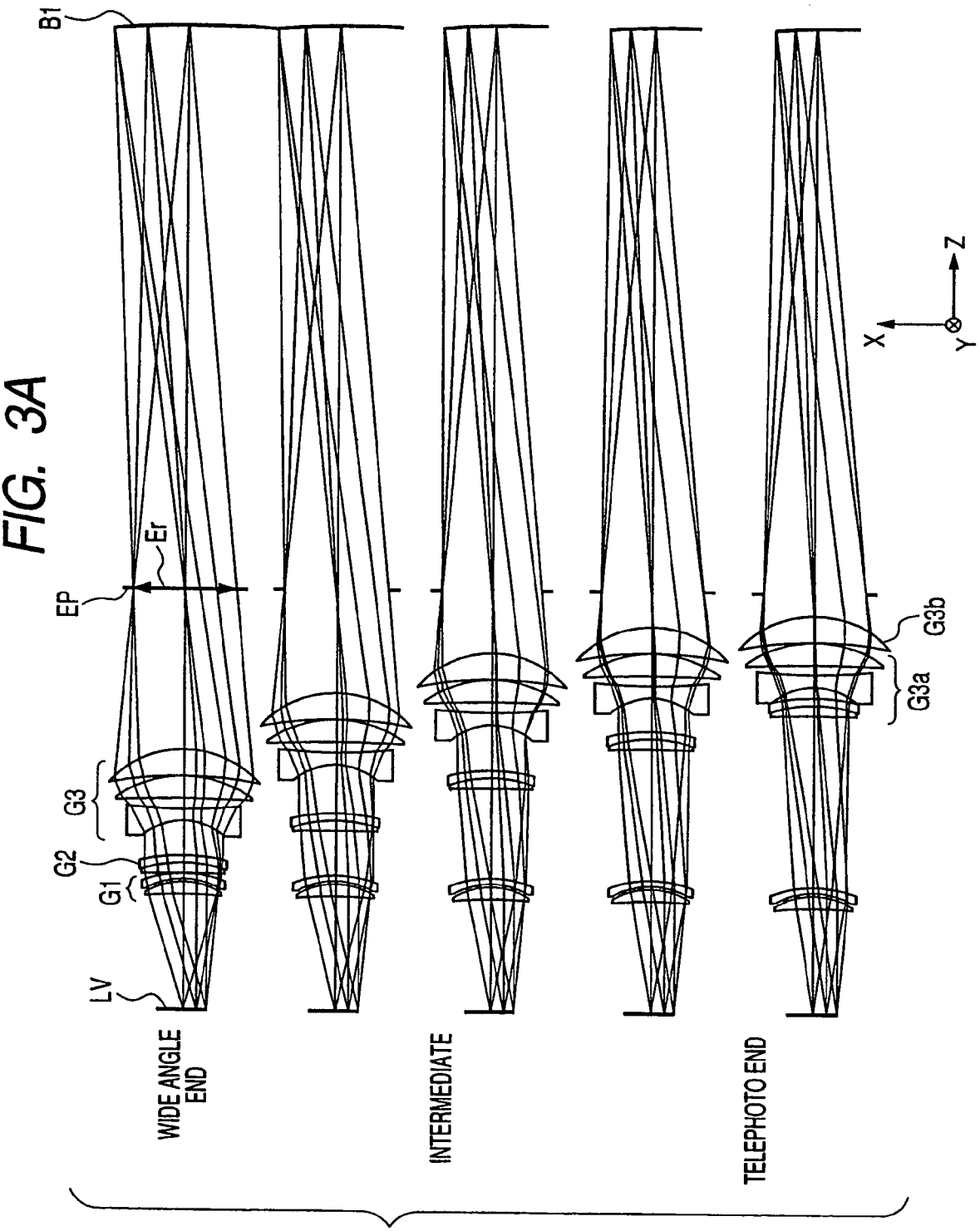

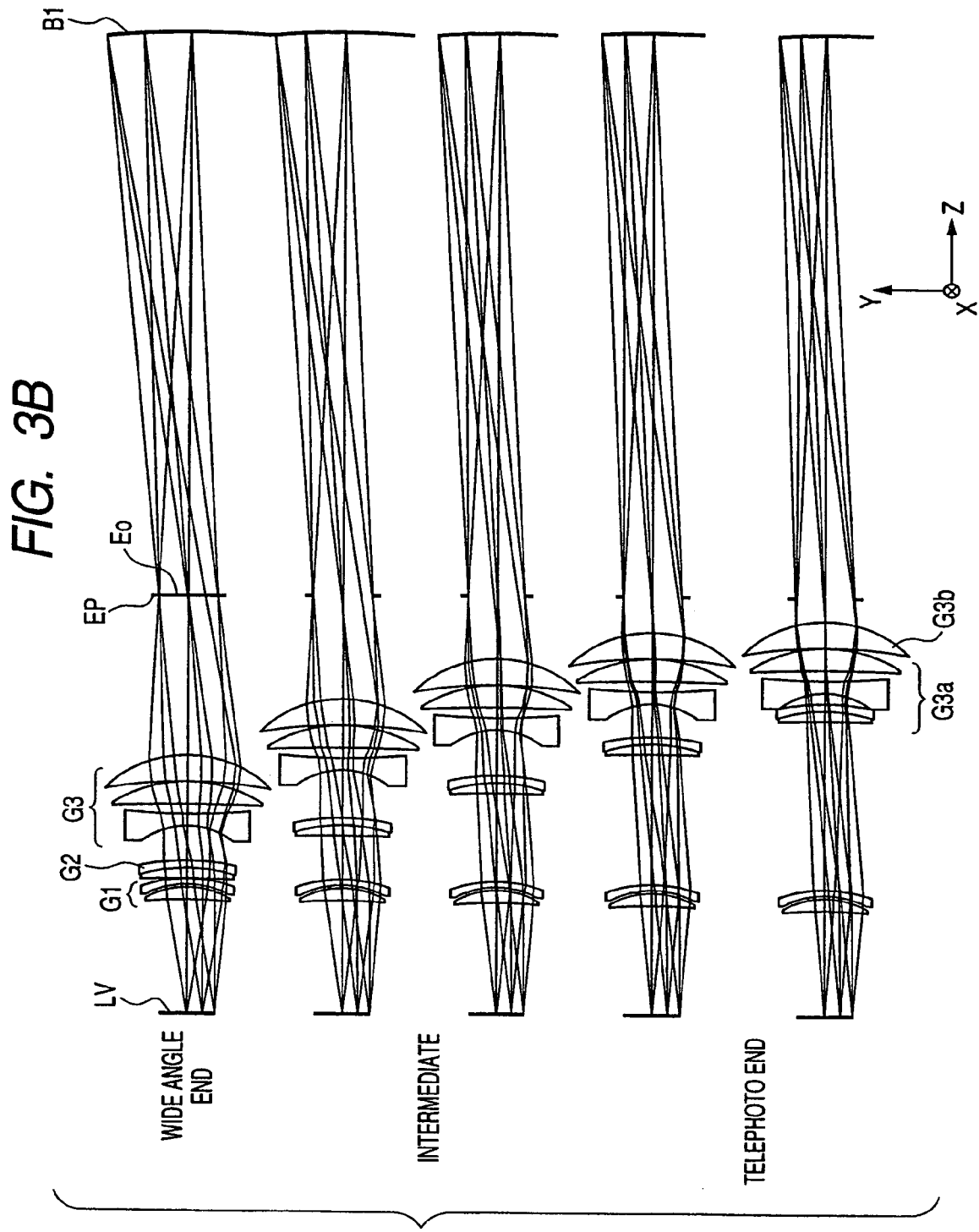

|  | p1 | p2 | p3 | p4 |
|---|---|---|---|---|
| EMBODIMENT 1 | 0.012302 | 0.0073326 | −0.0079856 | 0.00920783 |
| EMBODIMENT 2 | 0.0100746 | 0.0069188 | −0.0128333 | 0.011212 |
| CONSTITUENTS OF 4 LENS UNITS OF EMBODIMENT 2 | 1ST TO 4TH SURFACES | 5TH TO 8TH SURFACES | 9TH TO 12TH SURFACES | 13TH TO 14TH SURFACES |

ZOOM OPTICAL SYSTEM

BACKGROUND OF THE INVENTION

1. Field of the invention

The present invention relates to a zoom optical system used for an optical apparatus such as an image projecting apparatus, an exposure apparatus and the like.

2. Related background art

Some optical apparatuses as described above need a zoom optical system that is excellent in the telecentricity on the object side and excellent, in invariance of positions of the object surface, the image plane and the exit pupil to a variation of the focal length.

For example, Japanese Patent Application Laid-Open No. 2002-207167 has disclosed a zoom optical system suitable for illumination optical system installed in a projection exposure apparatus, that moves a lens unit having negative refractive power or a lens unit including a lens element having a strong negative refractive power toward an object side as focal length gets shorter so as to make positions of an object surface, an image plane, an entrance pupil and an exit pupil immobile against variation of focal length.

In addition, in Japanese Patent Application Laid-Open No. 2002-055279, zoom optical system suitable for a transmission optical system in illumination optical system installed in a projection exposure apparatus has been disclosed. The zoom optical system includes at least four lens units and at least three lens units moves so as to change the refractive power arrangement from negative-positive-positive or positive-positive-negative in the order from the object side to a positive-negative-positive in the order from the object side during zooming from the wide angle end to the telephoto end and thereby positions of an object surface, an image plane, an entrance pupil and an exit pupil are made immobile against variation of focal length.

Here, it is considered to use a zoom optical system disclosed in Japanese Patent Application Laid-Open No. 2002-207167 and Japanese Patent Application Laid-Open No. 2002-055279 in projection optical system or a part thereof of an image projecting apparatus of magnifying/projecting an image of an original formed on a liquid crystal panel.

However, if liquid crystal panel is disposed on a reduction side focal plane of a zoom optical system disclosed in Japanese Patent Application Laid-Open No. 2002-207167, it is impossible to secure a, sufficient back focus and space for arranging a color synthesizing member at the reduction side. For a so-called 3-plate type image projecting apparatus, a color synthesizing member for synthesizing three color lights of red, green and blue is arranged on the reduction side of a zoom optical system. However, if there is no sufficient back focus as described above, it will become impossible to secure a space for arranging the color synthesizing member.

In addition, in the zoom optical system disclosed in Japanese Patent Application Laid-Open No. 2002-207167, a lens unit at the most reduction side has a negative refractive power, and as focal length gets shorter, a lens unit having a positive refractive power arranged on a magnification side of the negative lens unit (a second lens unit) moved toward the magnification side so that an interval between the both lens units increases. Therefore, the effective diameter of the positive lens unit will get large. Moreover, since the lens unit at the most reduction side has a negative refractive power, a numerical aperture (NA) on the reduction side will get small.

Here, in Japanese Patent Application Laid-Open No. 2002-207167, such a case where a lens unit at the most reduction side is caused to have a positive refractive power is disclosed. However, since this lens unit significantly moves toward the magnification side as the focal length gets shorter, the effective diameter of the lens unit will get large if the NA on the reduction side is made large.

That is, in this zoom optical system, in a state of the minimum focal length (wide), a plurality of lens units get closer toward an aperture stop side, and as the focal length gets longer, move toward the reduction side focal plane side, and therefore the effective diameter of the lens unit is apt to get large, which is not appropriate for deriving compactness. Moreover, that is not appropriate either for securing a sufficient back focus since a lens unit on the most magnification side has a positive refractive power. Furthermore, the zoom optical system assumes a light source with single wavelength, and is inappropriate for a projection display of a color image.

In addition, in the zoom optical system disclosed in Japanese Patent Application Laid-Open No. 2002-055279, a synthesized refractive power of the adjacent lens units get occasionally, negative, that is, the refractive power is weak. Accordingly, the focal length is large as long as 190 mm at minimum. This takes place since the zoom optical system is an optical system intended to be appropriate for an exposure apparatus, and this system is not suitable for an optical system such as a projector etc. that is desired to derive compactness and a wide angle. In addition, likewise the zoom optical system disclosed in Japanese Patent Application Laid-Open No. 2002-207167, this zoom optical system assumes a light source with a single wavelength, and therefore is inappropriate for a projecting display of a color image.

SUMMARY OF THE INVENTION

According to one aspect of the invention, a zoom optical system includes, in order from a reduction side to a magnification side: a first lens unit having positive optical power; a second lens unit having the positive optical power; a third lens unit having negative optical power; and a fourth lens unit having the positive optical power, wherein respective intervals between said first, second, third and fourth lens units change during zooming; a conjugate position on the magnification side with respect to a conjugate position on the reduction side, and a position of a pupil of the zoom optical system with respect to the conjugate position on the reduction side, are substantially fixed over an entire zooming range; and the fourth lens unit moves to the magnification side, and an interval between the first lens unit and the fourth lens unit increases during zooming from a wide angle end to a telephoto end.

According to another aspect of the invention, a projection optical system includes a zoom optical system set out in the foregoing, wherein a light beam from an original disposed in the reduction conjugate position is projected onto a surface to be projected.

According to another aspect of the invention, a projection optical system includes: a zoom optical system set out in the foregoing; a reflecting member disposed substantially at a position of the pupil and reflecting the light from said zoom optical system; and a reflection optical system including a plurality of reflecting surfaces that sequentially reflect the light from said reflecting member, wherein a light beam incident on said zoom optical system from an original disposed in the reduction conjugate position, is projected onto a surface to be projected by said reflection optical system; and a projection image projected on the surface to be projected moves on the surface to be projected by rotating said reflecting member.

According to another aspect of the invention, an image projecting apparatus includes: a projection optical system set out in the foregoing; and an image forming element forming the original.

According to another aspect of the invention, a zoom optical system includes, in order from a reduction side to a magnification side: a first lens unit having positive optical power; a second lens unit having the positive optical power; and a third lens unit having the positive optical power, wherein respective intervals between the first, second and third lens units change during zooming; a conjugate position on the magnification side with respect to a conjugate position on the reduction side, and a position of a pupil of the zoom optical system with respect to the conjugate position on the reduction side, are substantially fixed over an entire zooming range; the third lens unit moves close to the magnification side, and an interval between the first lens unit and the third lens unit increases during zooming from a wide angle end to a telephoto end; and wherein an interval between the second lens unit and the third lens unit at the telephoto end is narrower than an interval between the second lens unit and the third lens unit at the wide angle end.

According to another aspect of the invention, a projection optical system includes a zoom optical system set out in the foregoing, wherein a flux of light from an original disposed in the reduction, conjugate position is projected on a surface to be projected.

According to another aspect of the invention, a projection optical system includes: a zoom optical system set out in the foregoing; a reflecting member disposed substantially at a position of the pupil and reflecting the light from the zoom optical system; and a reflection optical system including a plurality of reflecting surfaces that sequentially reflect the light from the reflecting member, wherein a light beam incident on the zoom optical system from an original disposed in the reduction conjugate position, is projected onto a surface to be projected by the reflection optical system; and a projection image projected on the surface to be projected moves on the surface to be projected by rotating the reflecting member.

According to another aspect of the invention, an image projecting apparatus includes: a projection optical system set out in the foregoing; and an image forming element forming the original.

According to another aspect of the invention, an image projecting system, comprising: an image projecting apparatus set out in the foregoing; and an image information supplying apparatus for supplying the image projecting apparatus with image information for forming the original.

BRIEF DESCRIPTION OF THE DRAWINGS

FIG. 1 is a view showing an outline of construction of a zoom optical system as an embodiment of the present invention;

FIG. 2A is a sectional view showing the zoom optical system according to an embodiment 1 of the present invention;

FIG. 2B is a sectional view of the zoom optical system according to the embodiment 1;

FIG. 3A is a sectional view showing the zoom optical system according to an embodiment 2 of the present invention;

FIG. 3B is a sectional view of the zoom optical system according to the embodiment 2;

DETAILED DESCRIPTION OF THE PREFERRED EMBODIMENTS

Figure 4:
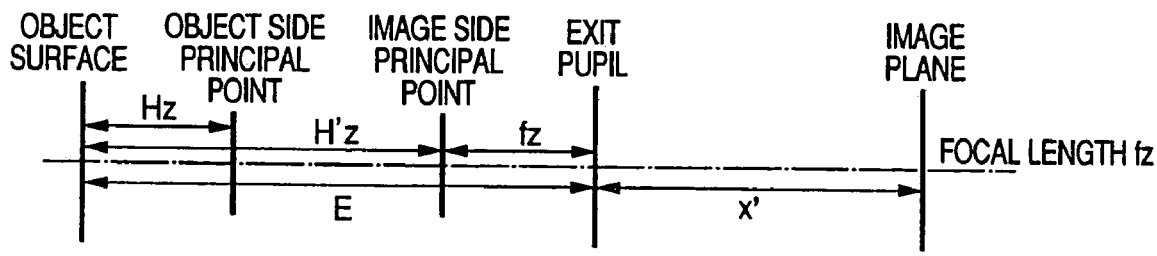
FIG. 4 is a diagram showing a paraxial relationship in the zoom optical system according to the present invention.

One of the objects, in the present embodiment is to provide a zoom optical system exhibiting an excellent telecentricity on an object side and excellent invariability of positions of an object surface, an image plane and an exit pupil with respect to a focal length and, besides, capable of becoming compact in configuration, giving brightness and sufficiently ensuring a back-focus.

Herein, at first, features of the zoom optical system in this embodiment will be described.

One of the zoom optical systems in the present embodiment has a plurality of zoom lens units, each of which integrally move during zooming, and includes, in order from a reduction side to a magnification side, a first lens unit having positive optical power, a second lens unit having the positive optical power, a third lens unit having negative optical power and a fourth lens unit having the positive optical power. Further, another zoom optical system in the present embodiment has a plurality of zoom lens units, each of which integrally move during zooming, and includes in order from the reduction side to the magnification side, a first lens unit having the positive optical power, a second lens unit having the positive optical power, and a third lens unit having the positive optical power. As a matter of course, other optical elements may also be inserted as auxiliary elements. Even when adding, to the zoom optical system in the present embodiment, the optical elements such as a polarizing plate, a wave plate, a lens having small optical power (refractive power) (having a focal length that is longer than a focal length at a wide angle end or longer than a twice the focal length at a wide angle end), a diffraction grating and a mirror, this construction is substantially the same as the zoom optical system in the present embodiment.

Herein, in these zoom optical systems, intervals between the respective lens units vary during zooming, and conjugate points on the magnification side and on the reduction side and the position of the pupil between these conjugate points, are individually substantially fixed.

Herein, in the former zoom optical system, during zooming from a wide angle end to a telephoto end, the fourth lens unit moves close to the pupil on the magnification side, and the interval between the first lens unit and the fourth lens unit increases.

Moreover, in the latter zoom optical system, during zooming from the wide angle end to the telephoto end, the third lens unit moves close to the pupil on the magnification side, and the interval between the first lens unit and the third lens unit increases. Further, an interval between the second lens unit and the third lens unit at the telephoto end is narrower than that at the wide angle end.

Note that in the present embodiment, the pupil described above is positioned outside the zoom optical system. FIG. 1 illustrates the zoom optical system and a positional relationship between an entrance pupil and the exit pupil in this zoom optical system. The two pupils do not exist (in an interior) between the first surface and the last surface of the zoom optical system, but are positioned outside.

A first feature is a point that the first lens unit disposed on the most reduction side is given the positive refractive power (the optical power, i.e., an inverse number of the focal length) in order to ensure a sufficient back-focus while maintaining the whole zoom optical system in a compact configuration and to attain a bright optical system. Owing to this feature, an NA (numerical aperture) on the object side can be increased while restraining effective diameters of the lens units disposed on the magnification side of the first lens unit.

If the refractive power of the first lens unit is negative, the effective diameters of the second lens unit and the lens units disposed on the magnification side of the second lens unit are easy to increase. Even if the second lens unit is given the positive refractive power, and if the interval between the first lens unit and the second lens unit is expanded when the focal length fluctuates, it follows that the effective diameter is still enlarged, and eventually this leads to a scale-up of the whole zoom optical system.

A second feature lies in a point of expanding an interval between the lens unit (the first lens unit) positioned closest to the reduction side and the lens unit (the fourth lens unit or the third lens unit) positioned closest to the magnification side when changing the focal length of the zoom optical system from the short side to the long side, i.e., zooming from the wide angle end to the telephoto end. In the case of fixing a pupil diameter with respect to the fluctuation in the focal length, the NA on the reduction side comes to the maximum when at a minimum focal length (the wide angle end) and becomes smaller as the focal length gets longer. Therefore, the lens unit positioned closest to the magnification side is arranged to be positioned closest to the reduction side within a movable range thereof at the wide angle end, and is moved closer to the magnification side as the focal length becomes longer. This arrangement enables a high magnification to be acquired without increasing the effective diameter.

A third feature is that the lens unit disposed between the lens unit positioned on the most reduction side and the lens unit positioned on the most magnification side, is also made movable in order to preferably correct an aberration while retaining the position of the object surface (the conjugate point on the reduction side), the image plane (the conjugate point on the magnification side) and the pupil position substantially fixed (unmovable) over the entire zooming range.

It should be noted that the aberration can be corrected more preferably by increasing the number of movable lens units, however, the present invention does not give any restriction to the number of movable lens units. Further, the number of movable lens units is increased by adding a focus lens unit that does not substantially contribute to the zooming, however, this case is also included in the scope of the present invention.

A fourth feature is that the position of the lens unit on the most reduction side at the telephoto end, is closer to a conjugate plane (the conjugate point) on the reduction side than the position of the lens unit on the most reduction side at the wide angle end, and the position of the lens unit on the most magnification side at the telephoto end is closer to a conjugate plane on the magnification side than the position of the lens unit on the most magnification side at the wide angle end. With this feature, the high magnification can be obtained though small in size.

Figure 14:
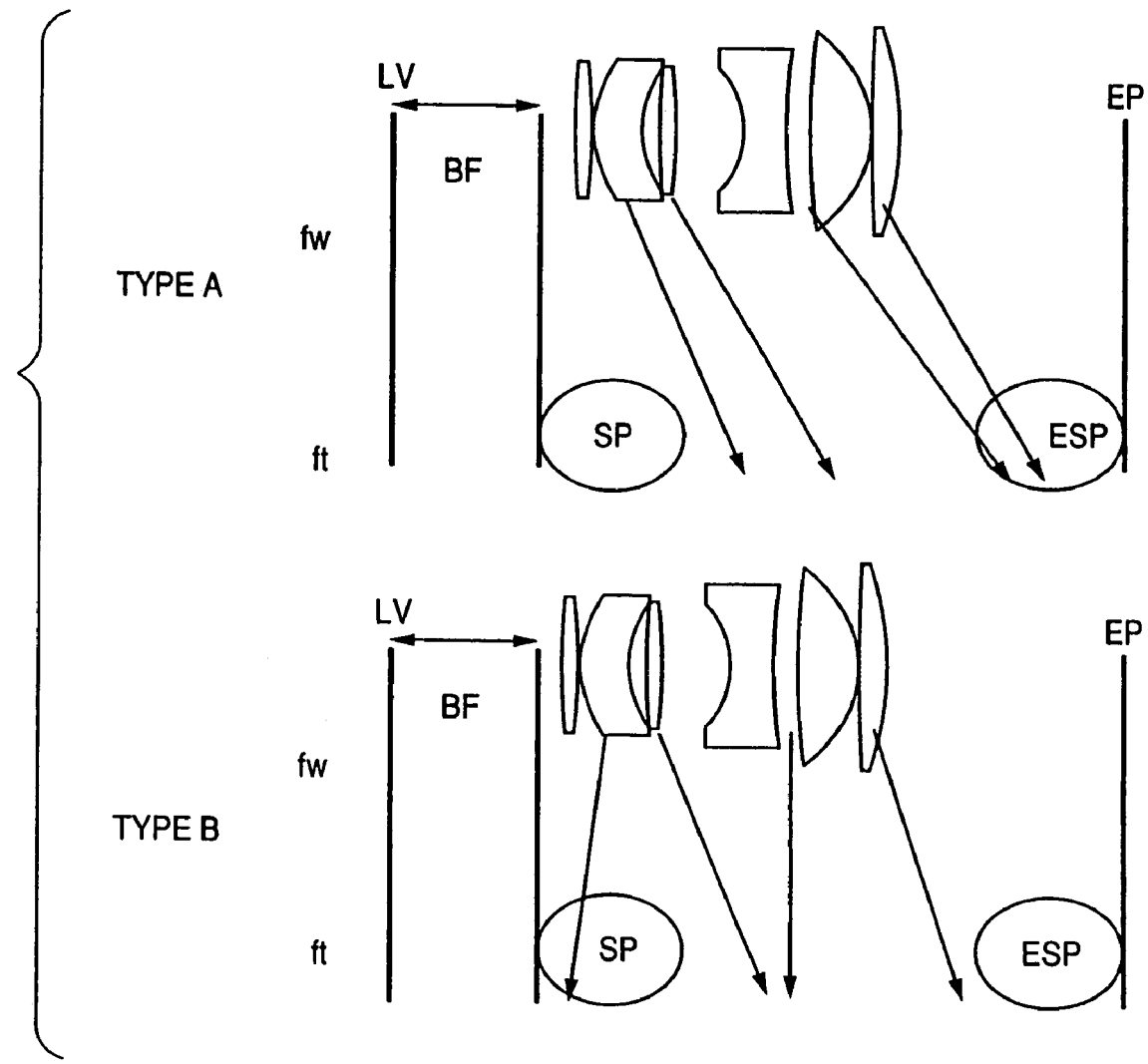
FIG. 14 is a view showing a comparison in locus of movement of each of the lens units during zooming from a wide angle end to a telephoto end between a conventional embodiment and the present embodiment.

In the case of setting the conjugate plane on the reduction side as an object surface, the conjugate plane on the magnification side becomes an image plane, the pupil on the reduction side becomes an entrance pupil, and the pupil on the magnification side becomes an exit pupil. FIG. 14 shows an outline of how the movable lens units move along respective loci different one another during zooming from the wide angle end to the telephoto end. The symbol LV represents an object surface where a light valve (a liquid crystal display panel) serving as an image projecting apparatus that will be explained later on, is disposed. The symbols G1 through G4 designate first through fourth lens units, BF indicates a back-focus, EP stands for an entrance pupil, SP designates a space on the object side, ESP represents a space on the exit pupil side, fw denotes a focal length on the wide angle end, and ft represents a focal length on the telephoto end.

AS in the case of a type A, when the first lens unit G1 disposed closest to the object side moves closer to the image side (the exit pupil side) as the focal length gets longer, it follows that the space SP on the object side can not be made useful for zooming operation performed by expanding the interval between the first lens unit G1 and the third lens unit G3, and an entire length of the zoom optical system is increased in order to obtain the high magnification.

By contrast, the variable power in a type B corresponding to the present embodiment is attained such that the first lens unit G1 moves closer to the object surface as the focal length becomes longer, and further the third lens unit G3 moves in an opposite direction to the movement of the first lens unit G1. This makes it possible to expand more easily the interval between the first lens unit G1 and the third lens unit G3 by making an effective use of the space SP than in the type A, and enables the zoom optical system to be more downsized than in the type A in the case of obtaining the same magnification. Furthermore, in the case of an embodiment 1 that will be described later on, the fourth lens unit G4 moves so as to sufficiently ensure the space ESP where a rotating mirror (RM in FIG. 5) is disposed. Moreover, in the case of an embodiment 2, the space ESP is ensured, and the third lens unit G3 moves in an opposite direction to the movement of the first lens unit G1.

A fifth feature resides in such a point that the optical system is approximately telecentric on the object side, and the plurality of lens units are moved along respective loci determined so that a distance from an image side principal point to the exit pupil in the zoom optical system is substantially equalized to the focal length of the zoom optical system over the entire zooming range.

Further, in relation to this point, a fifth feature lies in such a point that the plurality of lens units are moved along the respective loci determined so that an interval between the object side principal point and the image side principal point in the zoom optical system is substantially equalized to a value given by:

$$E - fz - fz(x' + fz)/x' \qquad (1)$$

where E is a distance from the object surface to an exit pupil plane positioned between the object surface and the image plane of the zoom optical system, x' is a distance from the exit pupil plane to the image plane, and fz is a focal length of the zoom optical system. The description of being "substantially equalized" is given herein and implies that a deviation up to 5% (preferably 3%, and more preferably 1%) from the value given by the aforementioned conditional expression (1) is allowable.

Herein, FIG. 4 shows a paraxial relationship of the zoom optical system in the present embodiment. In the case of setting the conjugate plane on the reduction side as the object surface, in a state where the object side is telecentric, the exit pupil is formed in a position at a distance equal to the focal length fz of the zoom optical system from the image side principal point. Namely, as for the layout and the moving locus of the lens unit in the zoom optical system in the present embodiment, the image side principal point is set to be positioned away by the focal length fz in its zooming state on the object side from the position of the exit pupil over the entire zooming range (a fifth feature).

Figure 9:
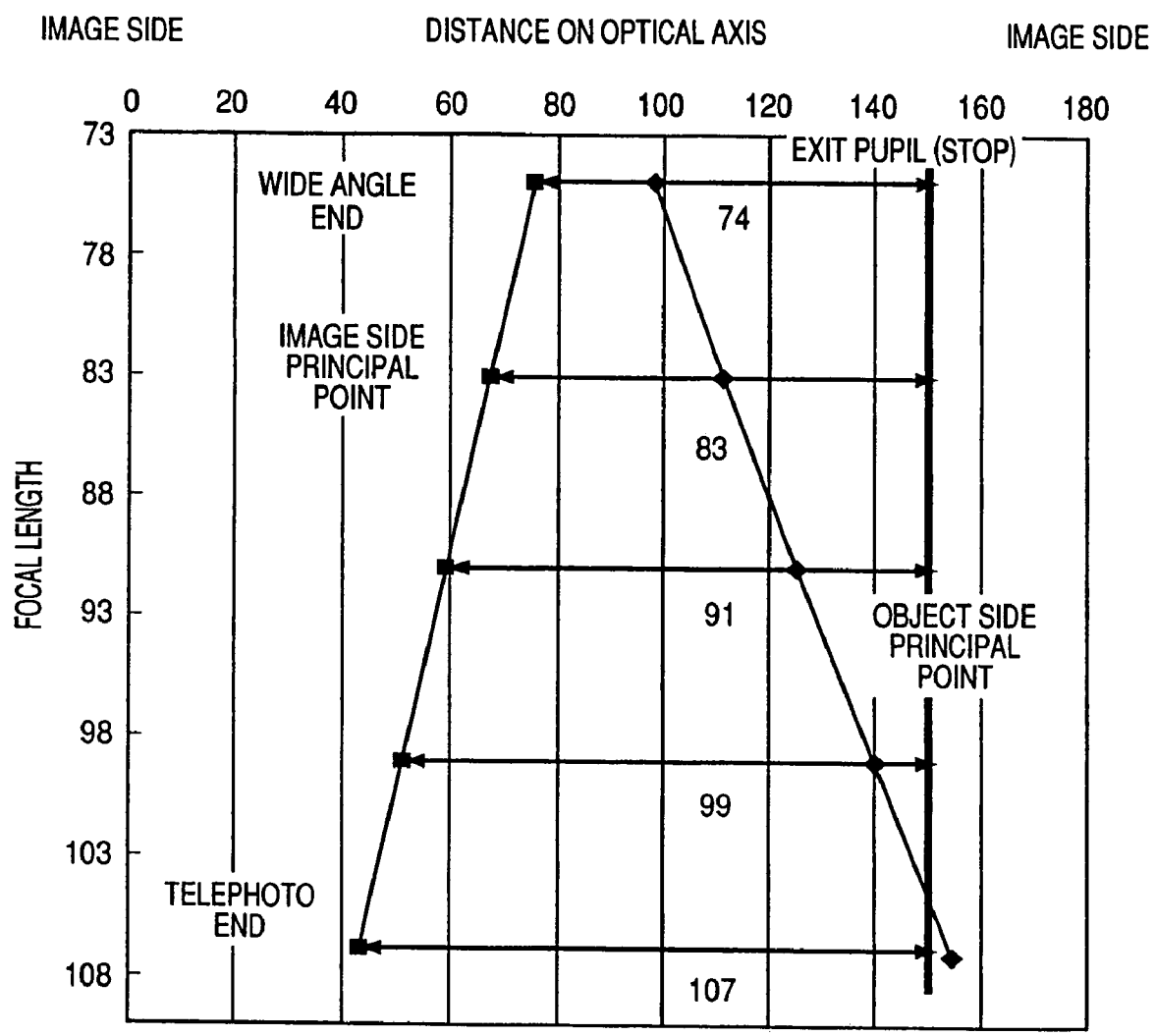
FIG. 9 is a graphic chart showing a relationship between an object side principal point, an image side principal point and an exit pupil position in the numerical embodiment 1.
Figure 11:
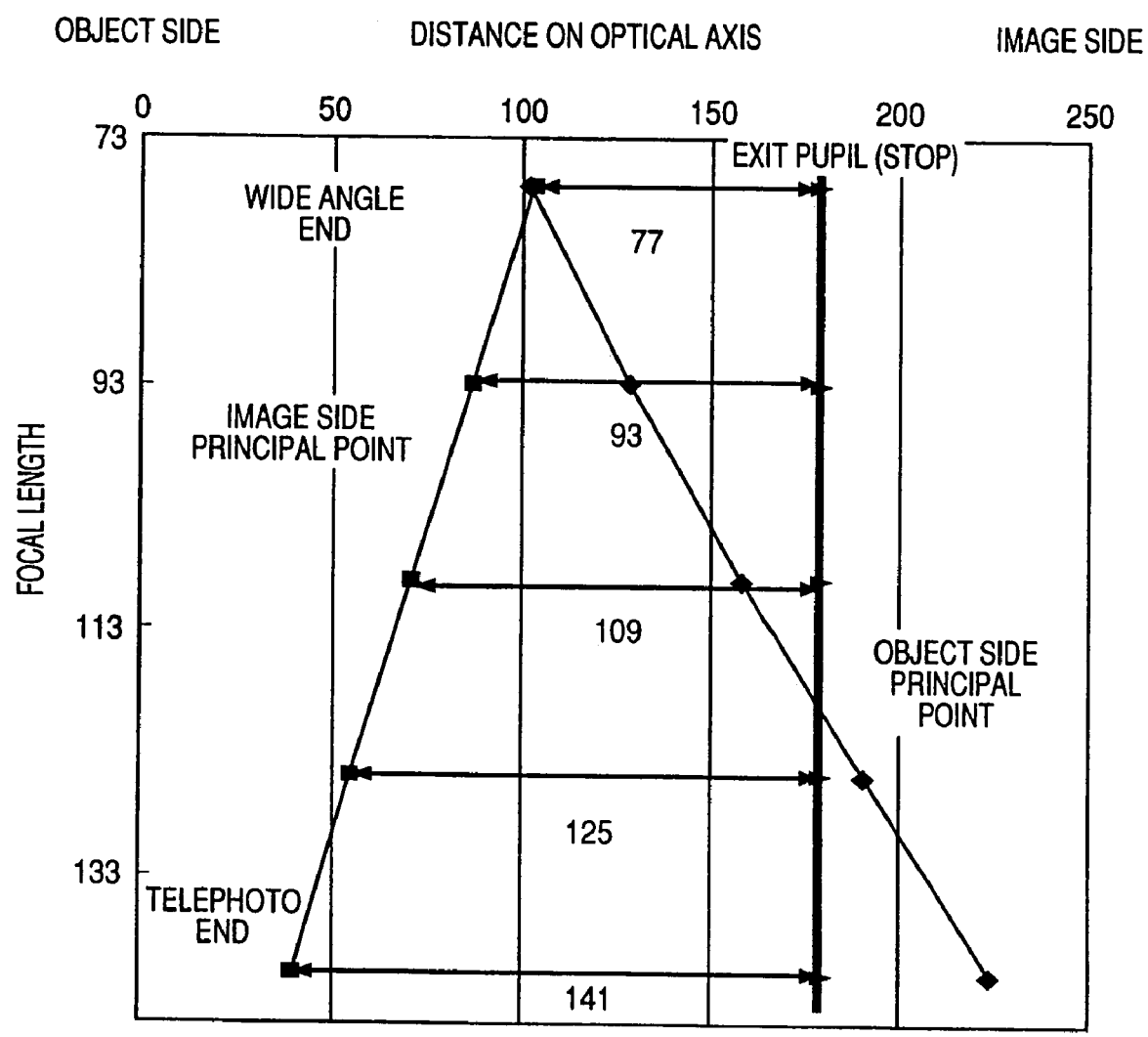
FIG. 11 is a graphic chart showing a relationship between the object side principal point, the image side principal point and the exit pupil position in a numerical embodiment 2.

FIGS. 9 and 11 respectively show distances from the image side principal point to the exit pupil with respect to the embodiment 1 and an embodiment 2. It is understood from FIGS. 9 and 11 that the distance from the image side principal point to the exit pupil is substantially equal to the focal length of the zoom optical system.

Further, as to the object side principal point, in addition to a relationship with the position of the exit pupil, this object side principal point is set so as to obtain predetermined magnification in a state where the object surface and the image plane exist in predetermined positions during zooming.

Namely, idealistically, if the image side principal point is positioned away from the position of the exit pupil by the distance corresponding to the focal length fz toward the object side, and further if the lens unit is disposed so that an interval (H'z–Hz) between the object side principal point and the image side principal point is substantially equal to the value given in the conditional expression (1) described above, in the telecentric optical system, the object surface, the image plane, the entrance pupil (infinite distance) and the position of the exit pupil can be made fixed (unmovable) during zooming (a sixth feature).

Figure 10:
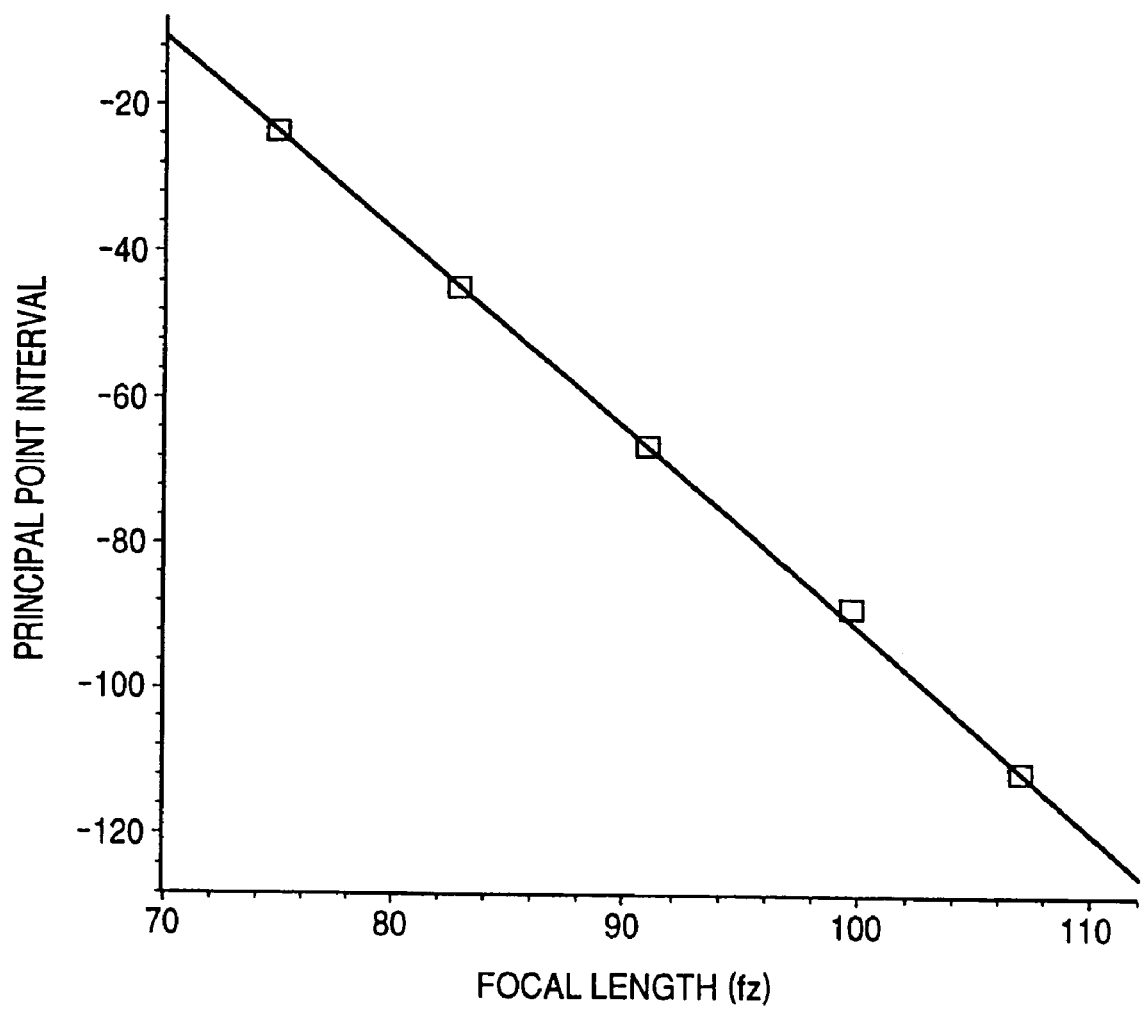
FIG. 10 is a graphic chart showing a theoretical value and an actual value of a principal point interval in the numerical embodiment 1.
Figures 12, 13:
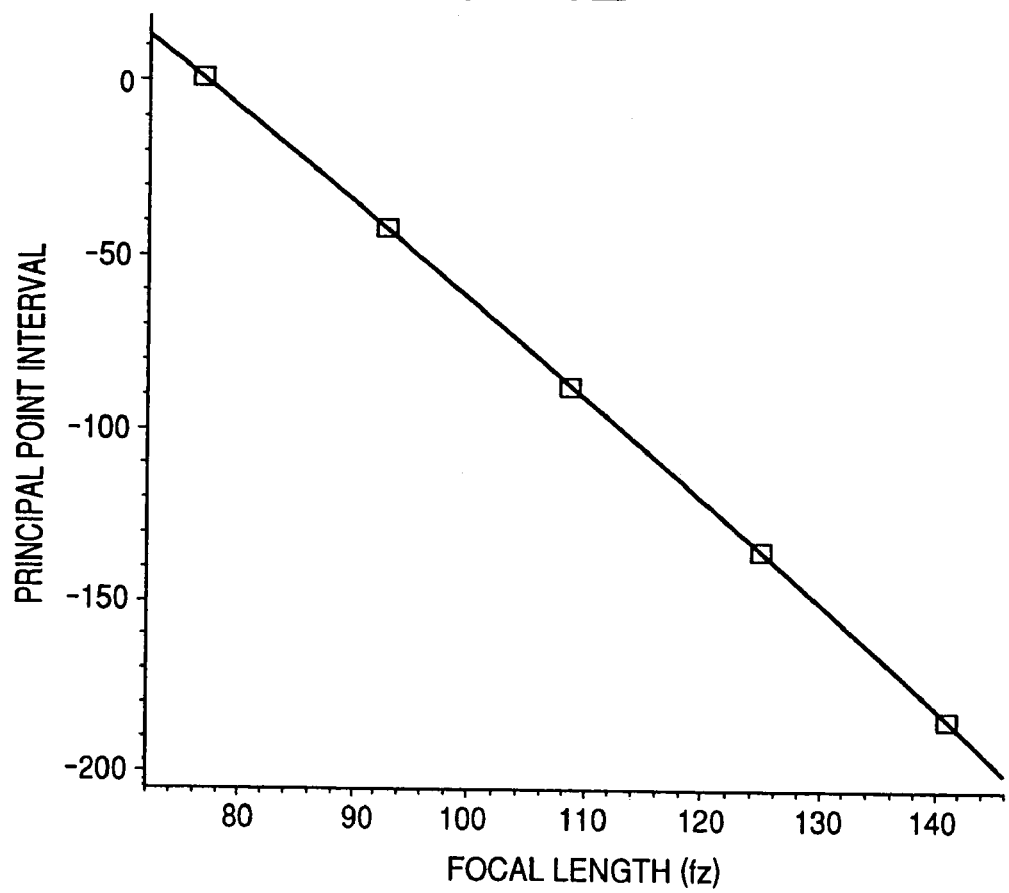
FIG. 12 is a graphic chart showing the theoretical value and the actual value of the principal point interval in the numerical embodiment 2.
FIG. 13 is a table showing refractive power of each of the lens units in the numerical embodiments 1 and 2.

With respect to the embodiment 1 and the embodiment 2, respectively in FIGS. 10 and 12, the theoretical value in the expression (1) is indicated by a solid line, and the actual principal point intervals at the respective focal lengths are plotted with void marks when dividing a range of the focal length equally by 5. It is understood from FIGS. 10 and 12 that the interval between the object side principal point and the image side principal point in the zoom optical system is substantially equal to the value given in the conditional expression (1).

A seventh feature lies in a point that a distance (back-focus) from the object surface to the first lens unit is equal to or more than three times as large as a maximum object height over the entire zooming range. In a 3-plate type image, projecting apparatus as will be exemplified in the following embodiment, a color synthesizing member for synthesizing three color light beams such as red, green and blue is disposed on the reduction side of the zoom optical system, and hence, if the back-focus is equal to or more than three times as large as the maximum object height (which is a distance from a point at the farthest distance from an optical axis in the effective area of the image forming element such as the liquid crystal display panel disposed in the position of the conjugate point on the reduction side to the axial point. This has, in addition to the maximum object height, the same meaning as "maximum image light of an original" as set forth in claims), it is possible to ensure the space (SP in FIG. 14) where the color synthesizing member is disposed.

A ninth feature is such a point that an interval between the pupil on the magnification side and the lens unit positioned on the most magnification side in the zoom optical system is longer than ½ (preferably monoploid, and more preferably double) of the minimum diameter of the pupil on the magnification side over the entire zooming range.

With respect to the embodiments 1 and 2, FIGS. 2B and 3B each show a section including the minimum diameter of the pupil on the magnification side. As understood from FIGS. 2B and 3B, over the entire zooming range between the telephoto end and the wide angle end, an interval between the pupil on the magnification side and the lens unit (which is the fourth lens unit G4 in the embodiment 1, and the third lens unit G3 in the embodiment 2) disposed on the most magnification side, i.e., the space ESP shown in FIG. 14 is ensured wider than the minimum diameter of the pupil on the magnification side (as a matter of course, wider than ½ of the minimum diameter thereof).

With this arrangement, for instance, as in an embodiment that will be explained later on, in the case of disposing a rotatable mirror (RM in FIG. 4) in the position of the exit pupil, it is feasible to avoid interference of the mirror with the lens unit disposed on the most magnification side. Note that actually a drive mechanism of the mirror exists in the periphery of the mirror, and hence the distance described above, though required to be set longer to some extent than ½ of the minimum diameter of the exit pupil, is set, it is preferable, within 10% of the distance (conjugate length) between the object surface and the image plane (between the conjugate points on the reduction side and on the magnification side). Further, the reason why "the minimum diameter of the pupil" is set is, as in the embodiment that will be described later on, for applying to a case in which the pupil diameter differs in two directions orthogonal to each other on the pupil surface. It should be noted that the minimum diameter of the pupil shall be a diameter of an inscribed circle to the external shape of the pupil.

Note that another feature is that the zoom optical system in the present embodiment involves employing aspherical surfaces for preferably correcting the aberration. The zoom optical system in the present embodiment is capable of obtaining, though small in size, the high magnification and is suited to, unlike the zoom optical systems for the exposure apparatuses disclosed in Japanese Patent Application Laid-Open No. 2002-207167 and Japanese Patent Application Laid-Open No. 2002-055279, an optical apparatus demanded to have a wider-angle optical system of a projector etc., wherein the focal length at the wide angle end is smaller than in the zoom optical systems disclosed in Japanese Patent Application Laid-Open No. 2002-20.7167 and Japanese Patent Application Laid-Open No. 2002-055279. Therefore, the refractive power held by the zoom optical system is large, and it is difficult to simultaneously correct an aspherical aberration and a chromatic aberration over the entire zooming range. This is because the chromatic aberration occurs due to the strong positive refractive power of the whole optical system, and it is more difficult to correct the chromatic aberration while correcting the spherical aberration than in a case of the optical system having comparatively small refractive power.

Such being the case, in the present embodiment, the aspherical aberration is corrected with a degree of freedom of the shape possessed by the aspherical surface by using the aspherical surface for correcting the chromatic aberration while maintaining "being small-sized". An aberration correcting effect is large when using the aspherical surface especially for the surface having a large diameter. The embodiments 1 and 2 exemplify the zoom optical systems using the aspherical surfaces.

Embodiment 1

Figure 5:
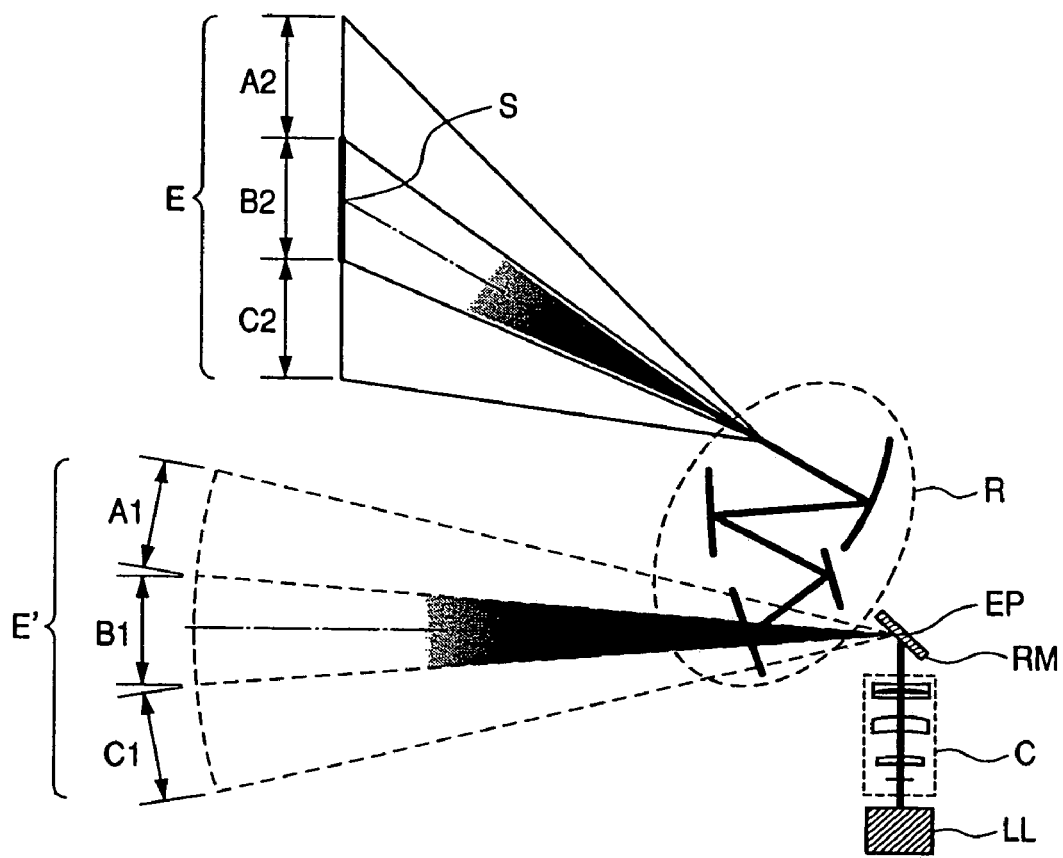
FIG. 5 is a view showing a principle for changing a projecting direction in an image projecting apparatus using the zoom optical system in the embodiment 1.

FIG. 5 illustrates an image projecting apparatus including a projection optical system constructed of a combination of the zoom optical system as the embodiment of the present invention and an off-axial optical system. Herein, the off-axial optical system is defined as an optical system including a curved surface (an off-axial curved surface) on which a plane normal at an intersecting point with a reference axis of a configuration surface does not exist on a reference axis when a route traced by a light beam traveling through an image center and a pupil center is set as the reference axis. In this case, the reference axis takes a bent shape. The configuration surface of the optical system is formed in a shape asymmetric with respect to the reference axis and also formed as an aspherical surface, whereby the optical system with a sufficiently-corrected aberration can be built up (refer to Japanese Patent Application Laid-Open No. H09-005650, Japanese Patent Application Laid-Open No. H08-292371, Japanese Patent Application Laid-Open No. H08-292372 and Japanese Patent Application Laid-Open No. H09-222561).

Moreover, this off-axial optical system, since the configuration surface is generally non-coaxial and vignetting does not occur on a reflection surface, makes it easy to build up the optical system using the reflection surface. Further, it is feasible to configure the compact optical system while having a wide angle of view by forming an intermediate image in the optical system. Still further, though the optical system is of a front stop type, the optical path can be comparatively flexibly designed, so that the compact optical system can be constructed.

The embodiment 1 can actualize the projection optical system that attains the wide angle of view, the high definition (fineness) and the high magnification by adopting the aforementioned off-axial optical system. Further, the zoom optical system in the embodiment 1 is adopted, and besides a plane mirror that will be explained later on is-rotated, whereby a position of a projected image is largely moved and inclined (i.e., an angle of projection is changed) with a small amount of deterioration of the image quality.

Herein, a basic principle for changing the angle of projection while keeping preferable optical performance will be explained with reference to FIG. 5.

In FIG. 5, the symbol LL represents an image forming element such as a liquid crystal panel and also represents an illumination system for making irradiation of the light modulated by this image forming element. The symbol C designates a first optical block that has image forming performance. The light emitted from the illumination system and modulated by the image forming element is reflected by the rotatable plane mirror RM and is thereafter image-formed on an area B1 on a spherical surface E where a position of an exit pupil EP of the first optical block C is defined as a center of curvature. Note that the first optical block C, on the condition that this optical block C has a capability of forming the image on the curved-surface area B1, may be an optical block that is in coaxial rotational symmetry and may also be an optical block including a reflection surface having a curvature as a component. In the present embodiment, however, the first optical block C is constructed of the zoom optical system according to the present invention.

Moreover, when the plane mirror RM disposed in the position of the exit pupil EP is rotated on a sheet surface in FIG. 5, the image formed on the area B1 moves to an area A1 or C1 on the spherical surface E' in a way that involves almost no optical change. Namely, the image consecutively moves on the spherical surface E' while maintaining the image-forming state.

Thus, the light reflected by the plane mirror RM is led to a second optical block R serving as an off-axial optical system including a plurality of reflection surfaces each having a curvature as components. At this time, the second optical block R is designed to form the image on the spherical surface E' on a screen E with the preferable optical performance. Further, the second optical block R can obliquely project the image on the screen E without causing any distortion of the image.

Accordingly, in a state where the plane mirror RM rotates to such a position as to direct the light toward the area B1, the image of the original that is formed on the image forming element is displayed on the area B2 on the screen E via the plane mirror RM and the second optical block R. Then, the images formed on the areas A1, B1 and C1 on the spherical surface E' can be formed respectively on areas A2, B2 and C2 on the screen by rotating the plane mirror RM. Namely, the image can be projected at an arbitrary angle of projection on a range (the screen E) in which the second optical block R assures the preferable optical performance. The member rotating about the exit pupil EP, as the center, of the first optical block C is not, however, limited to the plane mirror RM, the first optical block C and the image forming element may integrally be rotated, and the second optical block R may also be rotated. The rotations thereof are relative rotations of the optical blocks described above, and hence, whichever optical block is rotated, it is optically equivalent.

Moreover, the image is not necessarily formed on the spherical surface in the area B1 on the spherical surface E'. Namely, the surface E' does not need being the spherical surface. In other words, it is required that the image of the first optical block C be consecutively moved while keeping the preferable optical performance in order to make the angle of projection variable, and, for idealistically actualizing this, it is preferable that the surface E' is the spherical surface. In fact, however, there is a width in terms of tolerance of the optical performance about a focal depth, a distortion, etc., and hence, when falling within this tolerance, the surface E' may take any surface shapes and is not necessarily the spherical surface. Note that as to positional accuracy of the plane mirror RM disposed in the position of the exit pupil EP, the position of the plane mirror RM is not necessarily strictly coincident with the position of the exit pupil EP of the first optical block C, and it is enough if coincident with each other with an allowable width to some extent.

Moreover, the image forming performance of the first optical block C will be described in more detail. In the case of making an image plane S two-dimensionally movable on the screen E by use of the projection optical system in the present embodiment, if aberrations of all the angles of view in respective azimuth directions uniformly occur, there is no necessity of sufficiently correcting the aberrations. The reason why so is that if the aberrations of all the angles of view uniformly occur, the second optical block R configured by the reflection surfaces having the curvature can correct the aberrations.

Further, in the case of making the position of the image plane S movable only in one-dimensional direction on the screen E, if the aberrations of all the angles of view uniformly occur only in the moving direction, the image forming performance in a direction different from the moving direction is not required to be preferable. This is also because the aberrations can be corrected by the second optical block R.

Incidentally, only the principle about the movement of the image plane on the sheet surface in FIG. 5 has been explained herein, however, the principle is the same also in the case of moving the image plane in a direction orthogonal to the sheet surface. If the member rotating about the exit pupil EP as the center of the first optical block C is only the plane mirror RM and if the image plane is moved two-dimensionally on the screen E, however, it is preferable to use the plane mirror taking charge of rotations in the horizontal direction and the plane mirror taking charge of rotations in an up-and-down (vertical) direction. The reason for this is that when rotating the plane mirror RM in the direction orthogonal to the sheet surface in FIG. 5, as the image forming element and the plane mirror RM are in a twisted positional relation ship, the light beam on the reference axis on the screen E is image-formed in a desired position, however, it follows that the image plane S rotates on the screen E.

It is, however, physically impossible to dispose the plurality of plane mirrors at the exit pupil EP of the first optical block C. Therefore, even when the plane mirror RM is not disposed strictly in the position of the exit pupil EP, if the image on the surface E' falls within the range of the tolerance of the optical performance, the two pieces of plane mirrors RM can be disposed in the vicinity of the exit pupil EP by shifting the mirrors RM to such a degree as not to interfere with each other.

Given next is an explanation of a case of zooming in the present projection optical system and in the image projecting apparatus. If the first optical block C is given a zoom function and if sizes of the images formed on the areas A1, B1 and C1 on the spherical surface E' by use of this first optical block C are changed, it is possible to change the sizes of the images that are formed on the areas A2, B2 and C2 on the actual image plane (the screen) E.

For rotating the mirror RM in the position of the exit pupil EP of the first optical block C on the basis of the principle explained above, however, it is desirable that the position of the exit pupil EP be kept fixed during zooming. If the position of the exit pupil EP is fixed, the mirror RM and the second optical block R can be disposed in the fixed positions.

In the normal camera lens, the positions of the object surface and of the image plane are requested not to fluctuate with respect to the focal length that consecutively fluctuates. In the first optical block C according to the present embodiment, i.e., in the zoom optical system according to the present invention, however, in addition to that, the positions of the entrance pupil and of the exit pupil are requested to be kept fixed with respect to the fluctuations in the focal length. Herein, the reason why the position of the exit pupil is requested to be fixed is already explained in the principle given above, however, the reason why the position of the entrance pupil is requested to be fixed is that the telecentricity is required in the case of using the liquid crystal panel as the image forming element.

Given below is a description of a more specific construction of, in a 3-plate type image projecting apparatus in which modulated light beam in red, green and blue are synthesized and are made incident on the first optical block C, a zoom optical system exhibiting an excellent telecentricity on the object side and excellent invariability of the positions of the object surface, the image plane and entrance/exit pupils with respect to the fluctuations in the focal length in a way that ensures a sufficient space (i.e., the back-focus of the first optical block C) for inserting a color synthesizing element etc. between the image forming element and the first optical block C (the zoom optical system).

Figure 6:
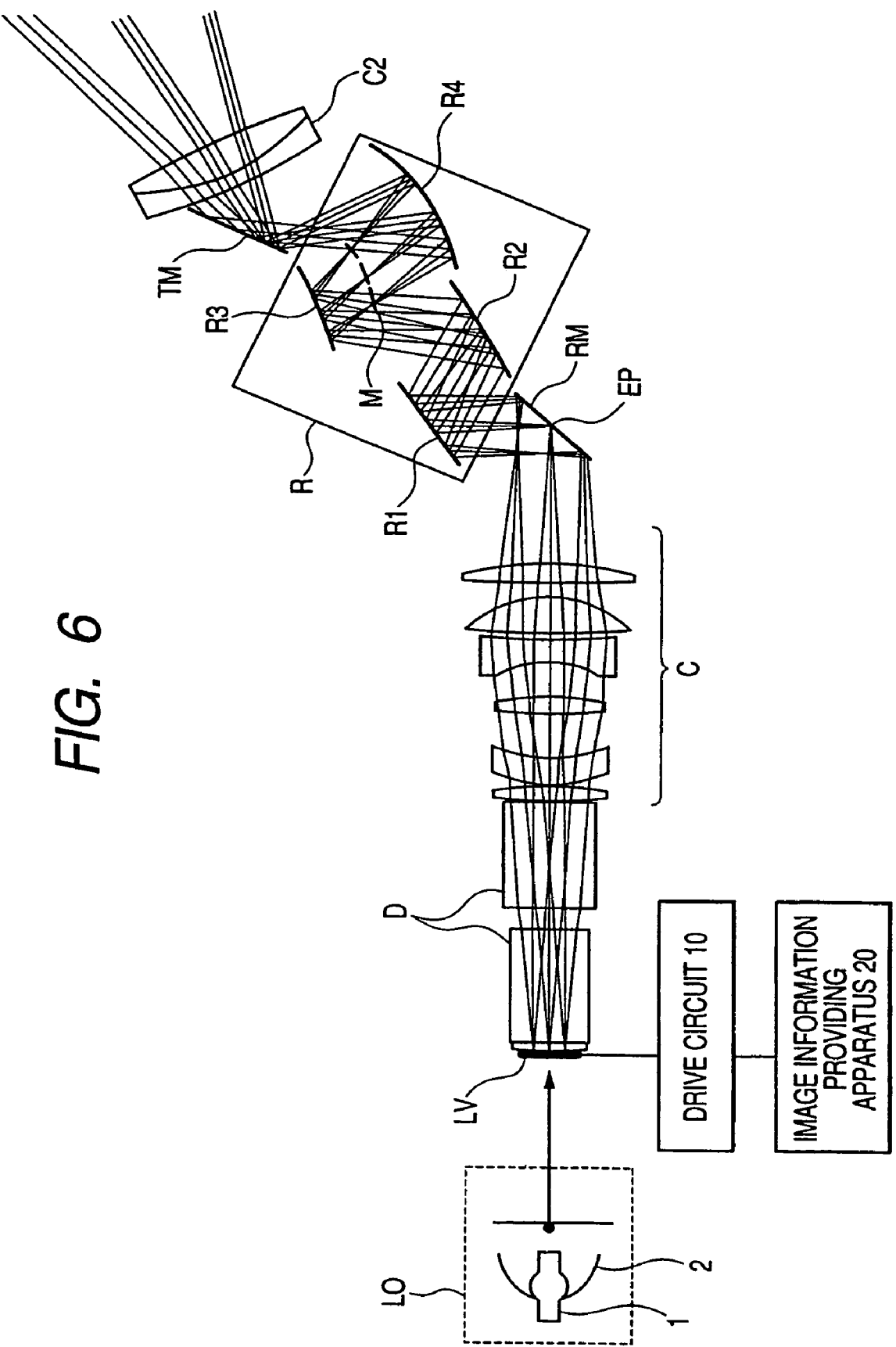
FIG. 6 is a sectional view showing the image projecting apparatus according to the embodiment 1 and a projection optical system.

FIG. 6 illustrates a whole construction of the 3-plate type image projecting apparatus. Referring to FIG. 6, the symbol LO represents an illumination system including a white light source lamp 1, a reflecting mirror 2, and a color separation element (unillustrated) for splitting the white light emitted from the light source lamp 1 into 3-color components such as red, green and blue.

The symbol LV designates a transparent type liquid crystal display panel serving as an image forming element. A drive circuit 10 is connected to the liquid crystal display panel LV. Connected to the drive circuit 10 is an image information providing apparatus 20 such as a personal computer, a DVD (Digital Versatile Disc) player, a video cassette recorder (VCR), a television, a digital video or a still camera, a receiving unit constituted-by an antenna for receiving a video carried on radio waves and a tuner, etc. The drive circuit 10 receiving the image information from the image i formation providing apparatus 20 transmits a drive signal corresponding to the image information to the liquid crystal display panel LV. The liquid crystal display panel LV receiving the drive signal forms an original corresponding to the drive signal by use of the liquid crystal and modulates the illumination light emitted from the illumination system LO. In the present embodiment, though not illustrated, three pieces of liquid crystal display panels LV are provided for red, green and blue, and form the original images in red, green and blue; respectively.

Note that the present embodiment exemplifies the case of employing the transparent type liquid crystal display panel as an image forming unit, however, the present invention is not limited to this liquid crystal display panel and can be applied to a case of using a reflection type liquid crystal display panel and a digital micro mirror array (DMD) and a self-luminous element (an electroluminescence element) in which the illumination system is not necessary.

The symbol D denotes a dichroic prism serving as a color synthesizing element for synthesizing color light beams modulated by the three liquid crystal display panels LV. The dichroic prism D is provided with a plurality of dichroic films, whereby the 3-color light beams are synthesized by transparent or reflecting action corresponding to wavelengths at these dichroic films. FIG. 6 shows two pieces of dichroic prisms, however, these dichroic prisms may be changed corresponding to what the image forming element LV requires. Further, a polarizing beam splitter may also be employed as a substitute for the dichroic prism.

The symbol C represents a zoom optical system-configuring the first optical block in FIG. 5, and is defined as a refracting optical unit (which will hereinafter be called a first refracting optical unit) constituted by a plurality of lens units as a paraxial optical system. The symbol EP denotes an exit pupil of the zoom optical system and is also an entrance pupil of a reflecting optical unit serving as a second optical block defined as an off-axial optical system constituted by a plurality of reflecting surfaces R1-R4. Note that a stop may be provided in this position or in the vicinity of this position as the necessity may arise.

The light that has been color-synthesized by the, dichroic prism D travels forward through the first refracting optical unit C, a first plane mirror RM rotatable in the position of the exit pupil EP and the reflecting optical units (R1-R4), and is further magnified and projected on an screen (not shown) defined as a projected surface through a second plane mirror TM and a second refracting optical unit C2. Herein, the second refracting optical unit C2 is constituted by a cemented lens of a single piece of negative lens (a negative meniscus lens convex to the reduction conjugate side) and a single piece of positive lens (biconvex lens) but is not limited to this construction. As a matter of course, the second refracting optical unit C2 may be constructed of not the cemented lens but the negative lens and the positive lens that are so disposed as to be spaced away from each other, may also be constructed of a biconcave lens and a biconvex lens and may further be a cemented lens composed of a positive meniscus lens convex to the magnification conjugate side and a negative meniscus lens convex to the magnification conjugate side. Moreover, this optical unit C2 may be constructed by only one positive lens (which is desirably the positive lens convex to the magnification conjugate side) or one negative lens. Preferably, however, the number of refractive optical elements disposed on the projected surface side of the reflecting optical system is four or less.

Moreover, the projection optical system constituted by the first and second refracting optical units C, C2, the first and second plane mirrors RM, TM and further the reflecting optical unit R, preferably corrects a trapezoidal distortion by the reflecting optical unit R defined as the off-axial optical system, and obliquely projects the image onto the screen.

Further, the projection optical system includes the first refracting optical unit C, whereby the optical power needed for the magnifying projection onto the screen can be properly shared between the first refracting optical unit C and the reflecting,optical unit R. Therefore, a curvature of each reflecting surface of the reflecting optical unit R is moderated, thereby facilitating manufacturing this reflecting optical unit R and making it possible to reduce sensitivity to a manufacturing error. Note that an influence of astigmatism difference etc. due to the manufacturing error of the reflecting surface becomes larger as the surface gets closer to the pupil. Then, the astigmatism difference etc. occurred on the first reflecting surface closest to the exit pupil EP among the plurality of reflecting surfaces, is magnified corresponding to the magnification of this reflecting optical unit. Accordingly, the sensitivity of the reflecting optical system can be reduced by sharing the magnifying power (optical power) necessary for the, image projection with the refracting optical system which has lower sensitivity to deterioration of performance due to the manufacturing error than in the reflecting optical system.

Moreover, even when the projection optical system is a wide angle system, it is relatively easy to restrain the occurrence of a chromatic aberration of magnification by setting long the focal length of the first refracting optical unit C. The chromatic aberration doesn't occur in reflecting optical unit R and is therefore effective in terms of correcting the various aberrations.

Referring to FIG. 6, each of the reflecting surfaces R1-R4 (each having the optical power) configuring the reflecting optical unit R takes a rotational asymmetrical shape and, as described above constitutes the off-axial optical system in which the reference axis is bent.

Moreover, in the present embodiment an intermediate image. (intermediate image forming surfacer M) is once formed between the reflecting surface R3 and the reflecting surface R4 within the reflecting optical unit R (a surface conjugate to both of the liquid crystal display panel and the screen is formed between the reflecting surfaces R3 and R4 within the reflecting optical unit). With this formation, a size of each of the reflecting surfaces can be made smaller than in the case of not having the intermediate image forming surface, and hence it is effective in terms of manufacturing the surface configuration with high accuracy. Note that the position of the intermediate image forming surface is not limited to the position show in FIG. 6. In the present embodiment, the reflecting optical unit R includes the four reflecting surfaces each having the optical power, however, any, number of reflecting surfaces are available on the condition that two or more surfaces (preferably three or more surfaces) included. If constructed to form the intermediate, image between the reflecting surface on the most screen side and the reflecting surface on the second-most screen side among these surfaces, the size of each reflecting surface can-be reduced.

Accordingly, in the projection optical system shown in FIG. 6, based on the principle for changing the projection angle explained referring to FIG. 5, the projection angle of the image from the projection optical system can be changed by rotating the first plane mirror RM.

The zoom optical system according to the present embodiment is suited to the off-axial optical system that ensures the sufficient space for inserting the color synthesizing member etc., exhibits the excellent telecentricity on the object side and the excellent invariability of the object surface, the image plane and the position of the exit pupil with respect, to the fluctuations in the focal length, then ensures the space for disposing the rotatable mirror between the lens unit closest to the position of the exit pupil and the position of the exit pupil, and has the image plane moving function, and is also suited to the image projecting apparatus employing this off-axial optical system.

The zoom optical system according to the embodiment 1 and an embodiment 2. that will hereinafter be described, corresponds to a zoom partial system in a projection optical system in which a liquid crystal panel size is 0.7 in. and an aspect ratio is 4:3.

FIGS. 2A and 2B show a configuration of an X-Z section and a configuration of a Y-Z section of the zoom optical system constituting the first refracting optical unit C. As described above, this zoom optical system is used as a partial system constituting a part of the projection optical system. Note that the symbols LV, D and EP in FIGS. 2A and 2B represent the same components marked with the same symbols in FIG. 6.

Referring to FIGS. 2A and 2B, the zoom optical system includes, in order from the reduction side to the magnification side (in the present embodiment, from the liquid crystal display panel LV side on the object side to the spherical surface area B1 side on the image side: B1 will-hereinafter be referred to as an image plane), a first lens unit G1 having the positive refractive power, a second lens unit G2 having the positive refractive power, a third lens unit G3 having the negative refractive power and a fourth lens unit G4 having the positive refractive power. The first through fourth lens units G1-G4 respectively move along an optical axis AXL during zooming (changing the focal length), and the intervals between the respective lens units change.

Further, in this zoom optical system, in all the focal length states between the maximum focal length (telephoto end) and the minimum focal length (wide angle end), i.e., over the entire zooming range, the object side is always substantially telecentric, and the position of the exit pupil EP positioned between the fourth lens unit G4 and the image plane B1, the position of the conjugate point on the reduction side where the liquid crystal panel LV is disposed and the position of the conjugate point on the magnification side where the image plane B1 is positioned, are individually substantially fixed (unmovable).

Herein, the expression that the position (the position of the conjugate point on the magnification side) of the image plane B1 is fixed (unmovable) connotes that the position of this image plane B1 and the position (the position of the conjugate point on the reduction side) of the liquid crystal display panel are substantially invariable. To be specific, the distance between the conjugate points of the liquid crystal display panel that are formed by the optical system (including the first refracting optical unit C) disposed between this liquid crystal display panel and the exit pupil and the liquid crystal display panel (the distance on the optical path of the light beam traveling through the optical axis of the first refracting optical unit), fluctuate within the limits of only 5% (preferably 3%, and more preferably 1%) in the entire zooming range (from the wide angle end to the telephoto end). The distance fluctuations connoted herein imply that the minimum value of the distance within the entire zooming range exists within a range of deviation equal to or less than the maximum value of 5% with respect to the maximum value. (the maximum value ×0.95 ≦ the minimum value).

This is the same with the position of the exit pupil, which implies that the position of the exit pupil is invariable with respect to the position of the liquid crystal display panel. Further, the minimum value, in the entire zooming range, of the distance between the exit pupil and the liquid crystal display panel is equal to or larger than the maximum value of 95% (preferably 97%, and more preferably 99%).

Herein, in particular, the expression that the position of the exit pupil is "substantially fixed" implies that parallax up to 2% 3% preferably 1% of the distance between the conjugate point on the magnification side and the conjugate point on the reduction is allowable. This is, as explained above, because there is actually the width in tolerance of the optical performance about the focal depth, the distortion, etc.

Moreover, in the zoom optical system concerned, during zooming from the wide angle end to the telephoto end, the interval between the first lens unit G1 and the second lens unit G2 monotonically increases, and the interval between the second lens unit G2 and the third lens unit G3 monotonically decreases. Further, the interval between the third lens unit G3 and the fourth lens unit G4 monotonically increases. Namely, the interval between the first lens unit G1 and the second lens unit G2 at the telephoto end is wider than the interval at the wide angle end, and the interval between the third lens unit G3 and the fourth lens unit G4 at the telephoto end is wider than the interval at the wide angle end. Then, during zooming from the wide angle end to the telephoto end, the interval between the first lens unit G1 and the fourth lens unit G4 (further, the interval between the first lens unit G1 and the third lens unit G3) monotonically increases.

Moreover, the position of the first lens unit G1 at the telephoto end is closer to the conjugate point (LV) on the reduction side than the position of the first lens unit G1 at the wide angle end, and the position of the fourth lens unit G4 at the telephoto end is closer to the conjugate point (B1) on the magnification side than the position of the fourth lens unit G4 at the wide angle end. To say further, during zooming from the wide angle end to the telephoto end, the fourth lens unit G4 becomes close to the pupil EP on the magnification side.

Moreover, in the present embodiment, as shown in FIGS. 2A and 2B, a width Eo in the Y-axis direction of the exit pupil EP and a width Er in an X-axis direction thereof are in a relationship given by:

$$Eo < Er (\text{e.g., } Er = 2Eo)$$

Namely, the diameter of the exit pupil EP differs in the Y-axis direction and in the X-axis direction, and the minimum diameter is Eo.

Moreover, the image B1 in FIG. 2A, as shown in the explanation of the principle for making the aforementioned projecting direction variable, moves by rotating the plane mirror RM disposed at the position of the exit pupil EP.

In the embodiment 1, the back-focus is ensured while maintaining the whole zoom optical system in the compact configuration, and the first lens unit G1 is given the positive refractive power to attain the bright optical system.

Hereinafter, as a numerical embodiment 1 corresponding to the embodiment 1 shown in, FIGS. 2A and 2B, configuration data of the zoom optical system are shown in Table 1. In Table 1, a "surface number" i represents an i-th surface counted from the object side. A "radius of curvature" is a radius (mm) of paraxial curvature of the i-th surface, a "surface interval" is an interval (mm) between the an i-th surface and an (i+1)-th surface, a "refractive index" is a refractive index of a medium between the i-th surface and the (i+1)-th surface, and an "Abbe number" is an Abbe number of the medium between the i-th surface and the (i+1)-th surface. These definitions are the same with the following numerical embodiments. Further, FIG. 13 shows the refractive power of each of the lens unit in the numerical embodiment 1.

Moreover, in the present embodiment, a 12th surface having the largest diameter in the zoom optical system is formed as an aspherical surface, thereby preferably correcting the various aberrations.

Herein, a configuration of the aspherical surface shall be expressed in the following formula (2).

$$z(r) = \frac{cr^2}{\sqrt{2 - (1+K)c^2 r^2}} + Ar^4 + Br^6 + Cr^8 + Dr^{10} \quad (2)$$

$$r^2 = x^2 + y^2$$

where K is a conic constant, and A through D are 4th-order through 10th-order deformation coefficients. In this formula, a Z-axis is taken in the optical-axis direction, an r-axis is taken in a direction orthogonal to the optical axis, and the light traveling direction is positive. The constant and the coefficients are described in Table 2 according to the embodiment 2. Note that "E-X" represents "×10$^{-x}$". Further, c denotes a curvature of the surface vertex.

TABLE 1

(Numerical embodiment 1)

Liquid crystal panel size: 0.7 in.
(the maximum object height is 8.89 mm)
Focal length fz: 75.0-107.0
Zoom ratio: 1.43
Aperture stop diameter: 40.0 mm

| Surface Number Object Surface | Radius of Curvature Infinity | Surface Interval Variable | Refractive Index | Abbe Number |
|---|---|---|---|---|
| 1 | 111.5325793 | 3.741963833 | 1.6297 | 58.5299 |
| 2 | −102.6903231 | 0.1 | | |
| 3 | 29.90536906 | 8.889701454 | 1.587387 | 60.8568 |
| 4 | 25.34858207 | Variable | | |
| 5 | 248.6520381 | 3 | 1.614453 | 60.6324 |
| 6 | −126.4800272 | Variable | | |
| 7 | −24.61105688 | 7.570898884 | 1.747787 | 31.7958 |
| 8 | 151.2002378 | 4.937420668 | | |
| 9 | 338.0288296 | 10.95265452 | 1.493233 | 69.7721 |
| 10 | −29.36925004 | Variable | | |
| 11 | 350.6016197 | 5.460926246 | 1.619161 | 60.3876 |
| 12 (Aspherical Surface) | −83.06598823 | Variable | | |
| 13 | Infinity | 240 | | |
| 14 (Image Plane) | −240 | 0 | | |

Aspherical Coefficient

12th Surface K (conic constant):−2.534751 A (4th-order):−0.323263E-6

B (6th-order): 0.127262E-9 C (8th-order):−0.317790E-13 D (10th-order): 0.253448E-15

Variable Interval

| fz | 75 | 83 | 91 | 99 | 107 |
|---|---|---|---|---|---|
| D0 | 52.9694 | 51.6399 | 49.999 | 47.9654 | 45.2364 |
| D4 | 3.3346 | 10.64884 | 18.5032 | 26.8121 | 36.1109 |
| D6 | 12.2233 | 13.11322 | 11.6902 | 8.44373 | 3.07643 |
| D10 | 0.1 | 3.475127 | 6.46482 | 9.03665 | 10.9228 |
| D12 | 36.7192 | 26.4693 | 18.6893 | 13.0886 | 10 |

Herein, a back-focus (a distance between the first lens unit and the conjugate position on the reduction side) in Table 1 is 45, 2364 (mm) or more and is 52.9694. (mm) or less. This value is a value obtained by effecting an air-conversion of the back-focus length and is, it is desirable, 35 mm or more (preferably 40 mm or more, and more preferably 43 mm or more) over the entire zooming range. To describe it in a different way, it is preferable that the above value is 45% or more (preferably 50% or more, and more preferably 55% or more) of the focal length of the zoom optical system at the wide angle end. Further, this back-focus is around 5.09 through 5.96 times as large as the maximum object height (8.8.9 mm) over the entire zooming range. It is desirable that this back-focus is equal to or more than 3 times (preferably equal to or more than 4 times) but equal to or less than 10 times (preferably 7 times) as large as the maximum object height. These value definitions are similarly applied to the following numerical value embodiment 2 (the back-focus length is 45 mm 48.9778 mm, and this is approximately 5.06-5.51 times as large as the maximum object height).

Further, a zoom ratio (a value obtained by dividing the focal length at the telephoto end by the focal length at the wide angle end) in the present embodiment is set to 1.43 but is not limited to this value. Herein, it is enough that this value is equal to or more than at least 1.2 times (preferably equal to or greater than 1.3 times, and more preferably equal to or greater than 1.4 times). It is desirable that an upper limit value is set equal to or smaller than 3.0 times or preferably equal to or smaller than 2.5 times, more preferably equal to or smaller than 2.0 times. These value definitions are similarly applied to the following numerical value embodiment 2 (zoom ratio is 1.83).

FIG. 9 shows that the interval between the exit pupil and the position of the principal point on the image side in the numerical embodiment 1 is substantially equal to the focal length of the zoom optical system. The respective lens units are, it is understood from FIG. 9, disposed so that the distance from the image side principal point to the exit pupil is approximately coincident with each focal length fz, and hence the exit pupil surface in addition to the object surface and the image plane can be fixed during zooming.

Moreover, in FIG. 10, the theoretical value in the expression (1) is indicated by a solid line, and the actual principal point intervals at the respective focal lengths are plotted with void marks when dividing a range of the focal length equally by 5. It is understood from FIG. 10 that the interval between the object side principal point and the image side principal point in the zoom optical system in the numerical embodiment 1 is substantially equal to the value given in the conditional expression (1).

Figure 7:
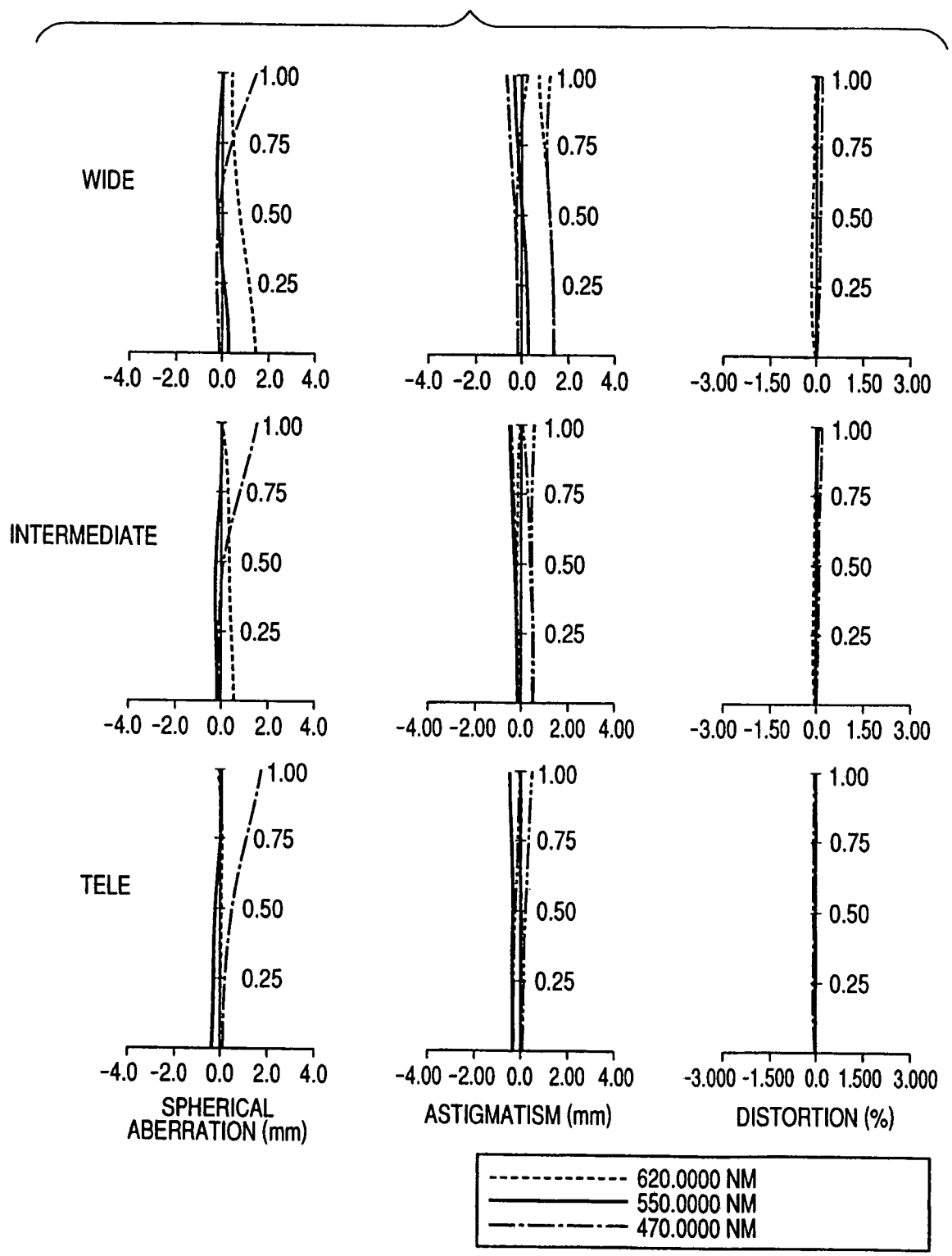
FIG. 7 is a longitudinal aberration diagram in a numerical embodiment 1 of the present invention.

Further, FIG. 7 shows a longitudinal aberration diagram in the numerical embodiment 1. FIG. 7 is the longitudinal aberration diagram showing, in order from the top, the longitudinal aberrations at a wide angle (focal length: 75 mm), at the intermediate point (focal length: 91 mm) and at a telephoto position (focal length: 107 mm). Wavelengths of evaluation rays are 620 nm (Red: R), 550 nm (Green: G) and 470 nm (Blue: B). It is recognized from FIG. 7 that the image is preferably formed.

Embodiment 2

FIGS. 3A and 3B show a configuration of an X-Z section and a configuration of a Y-Z section of the zoom optical system in the embodiment 2 of the present invention as well as being the zoom optical system constituting the first refracting optical unit C. This zoom optical system is used as a partial system constituting part of the projection optical system. Note that the symbols LV, D and EP in FIGS. 3A and 3B represent the same components marked with the same symbols in FIG. 6.

Referring to FIGS. 3A and 3B, the zoom optical system includes, in order from the reduction side to the magnification side (in the present embodiment, from the liquid crystal display panel LV side on the object side to the spherical surface area B1 side on the image side: B1 will hereinafter be referred to as an image plane), a first lens unit G1 having the positive refractive power, a second lens unit G2 having the positive refractive power, and a third lens unit G3 having the positive refractive power. Note that the third lens unit G3 is composed of two pieces of lens units such as a 3a-th lens sub-unit G3a having the negative refractive power and a 3b-th lens sub-unit G3b having the positive refractive power.

Namely, it can be considered that this zoom optical system is constituted by four lens units.

Herein, the 3a-th lens sub-unit G3a has the 9th to 12th surfaces and has the negative refractive power, i.e., −0.0128333, and the 3b-th lens sub-unit G3b has the 13th to 14th surfaces and has the positive refractive power, i.e., +0.011212.

The first through third lens units G1-G3 respectively move together along an optical axis AXL during zooming (changing the focal length), and the intervals between the respective lens units change.

Further, in this zoom optical system, in all the focal length states between the maximum focal length (telephoto end) and the minimum focal length (wide angle end), i.e., over the entire zooming range, the object side is always substantially telecentric, and the position of the exit pupil EP positioned between the third lens unit G3 and the image plane B1, the position of the conjugate point on the reduction side where the liquid crystal panel LV is disposed and the position of the conjugate point on the magnification side where the image plane B1 is positioned, are individually substantially fixed (unmovable).

Moreover, in the zoom optical system concerned, during zooming from the wide angle end to the telephoto end, the interval between the first lens unit G1 and the second lens unit G2 monotonically increases. Further, the interval between the second lens unit G2 and the third lens unit G3 decreases toward the telephoto end after once increasing from the wide angle end. Namely, the interval between the first lens unit G1 and the second lens unit G2 at the telephoto end is wider than the interval at the wide angle end, and the interval between the second lens unit G2 and the third lens unit G3 at the telephoto end is narrower than the interval at the wide angle end. Then, during zooming from the wide angle end to the telephoto end, the interval between the first lens unit G1 and the third lens unit G3 monotonically increases.

Moreover, the position of the first lens unit G1 at the telephoto end is closer to the conjugate point (LV) on the reduction side than the position of the first lens unit G1 at the wide angle end, and the position of the third lens unit G3 at the telephoto end is closer to the conjugate point (B1) on the magnification side than the position of the third lens unit G3 at the wide angle end. To say further, during zooming from the wide angle end to the telephoto end, the third lens unit G3 becomes close to the pupil EP on the magnification side.

Moreover, in the present embodiment, as shown in FIGS. 3A and 3B, a width Eo in the Y-axis direction of the exit pupil EP and a width Er in an X-axis direction thereof are in a relationship given by:

$$Eo < Er (e.g., Er = 2Eo)$$

Namely, the diameter of the exit pupil EP differs in the Y-axis direction and in the X-axis direction, and the minimum diameter is Eo.

Moreover, the image B1 in FIG. 3A, as shown in the explanation of the principle for making the aforementioned projecting direction variable, moves by rotating the plane mirror RM disposed in the position of the exit pupil EP.

In the embodiment 2, the back-focus is ensured while maintaining the whole zoom optical system in the compact configuration, and the first lens unit G1 is given the positive refractive power to attain the bright optical system.

Hereinafter, as a numerical embodiment 2 corresponding to the embodiment 2-shown in FIGS. 3A and 3B, configuration data of the zoom optical system are shown in Table 2.

Synthesized refractive power of the respective lens units moving integrally during zooming is positive in the first lens unit G1, positive in the second lens unit G2, and positive in the third lens unit (the 3a-th lens sub-unit G3a is negative, while the 3b-th lens sub-unit G3b is positive). Namely, as described above, the configuration in the present embodiment (the numerical embodiment) can be viewed also as the 4-lens-unit configuration as illustrated in FIG. 13. In this case, this configuration is treated as a configuration of the positive/positive/negative/positive lens units in order from the reduction side.

It should be noted that the 12th surface having the largest diameter in the zoom optical system is formed as an aspherical surface in the present embodiment, thereby preferably correcting the various aberrations.

TABLE 2

(Numerical embodiment 2)

Liquid crystal panel size: 0.7 in.
(the maximum object height: 8.89 mm)
Focal length fz: 77.0-141.0
Zoom ratio: 1.83
Aperture stop diameter: 40.0 mm

| Surface Number Object Surface | Radius of Curvature Infinity | Surface Interval Variable | Refractive Index | Abbe Number |
|---|---|---|---|---|
| 1 | −200.7662835 | 5.107982802 | 1.501725 | 62.6231 |
| 2 | −24.93705621 | 0.970992517 | | |
| 3 | −25.32661748 | 3 | 1.722675 | 46.6198 |
| 4 | −35.51958676 | Variable | | |
| 5 | −294.5874423 | 4.04713295 | 1.62027 | 60.3308 |
| 6 | −41.95939047 | 0.367868562 | | |
| 7 | −36.91755391 | 3 | 1.751431 | 31.6287 |
| 8 | −52.44897748 | Variable | | |
| 9 | −21.21358302 | 5.382872694 | 1.750626 | 32.6585 |
| 10 | 207.9154236 | 4.444872427 | | |
| 11 | −579.8572366 | 9.836779951 | 1.694857 | 49.3422 |
| 12 | −37.5057513 | 0.1 | | |
| 13 | −101.3591577 | 10.88658836 | 1.48749 | 70.4058 |
| 14 (Aspherical Surface) | −31.56728042 | Variable | | |
| 17 | Infinity | 240 | | |
| 18 (Image Plane) | −240 | 0 | | |

Aspherical Coefficient

14th Surface K-(conic constant):−2.536397 A (4th-order): 0.454254E-6

B (6th-order): −0.275635E-9 C (8th-order): 0.425692E-12 D (10th-order): −0.464988E-15

Variable Interval

| fz | 77 | 93 | 109 | 125 | 141 |
|---|---|---|---|---|---|
| d0 | 48.9778 | 48.4016 | 47.7799 | 46.9603 | 45 |
| d4 | 0.1 | 19.4213 | 38.4469 | 56.3758 | 73.8549 |
| d8 | 14.793 | 20.5748 | 19.5594 | 14.0926 | 4 |
| d14 | 68.9841 | 44.4572 | 27.0687 | 15.4262 | 10 |

FIG. 11 shows, similarly to the 4-lens-unit configuration (the configuration in the embodiment 1), that the interval between the exit pupil and the position of the principal point on the image side-in the numerical embodiment 2 is substantially equal to the focal length of the zoom optical system. The respective lens units are, it is understood from FIG. 11, disposed so that the distance from the image side principal point to the exit pupil is approximately coincident with each focal length fz, and hence the exit pupil surface in addition to the object surface and the image plane can be fixed during zooming. Namely, in the present numerical embodiment, as in the zoom optical system in the embodiment 1 having the 4-lens-unit configuration, the distance from the image side principal point to the exit pupil is equal to the focal length of the zoom optical system.

Moreover, in FIG. 12, the theoretical value in the expression (1) is indicated by a solid line, and the actual principal point intervals at the respective focal lengths are plotted with void marks when dividing a range of the focal length equally by 5. It is understood from FIG. 12 that the interval between the object side principal point and the image side principal point in the zoom optical system in the numerical embodiment 2 is substantially equal to the value given in the conditional expression (1) as case of the zoom optical system of the embodiment 1 which is four-lens-unit configuration.

Figure 8:
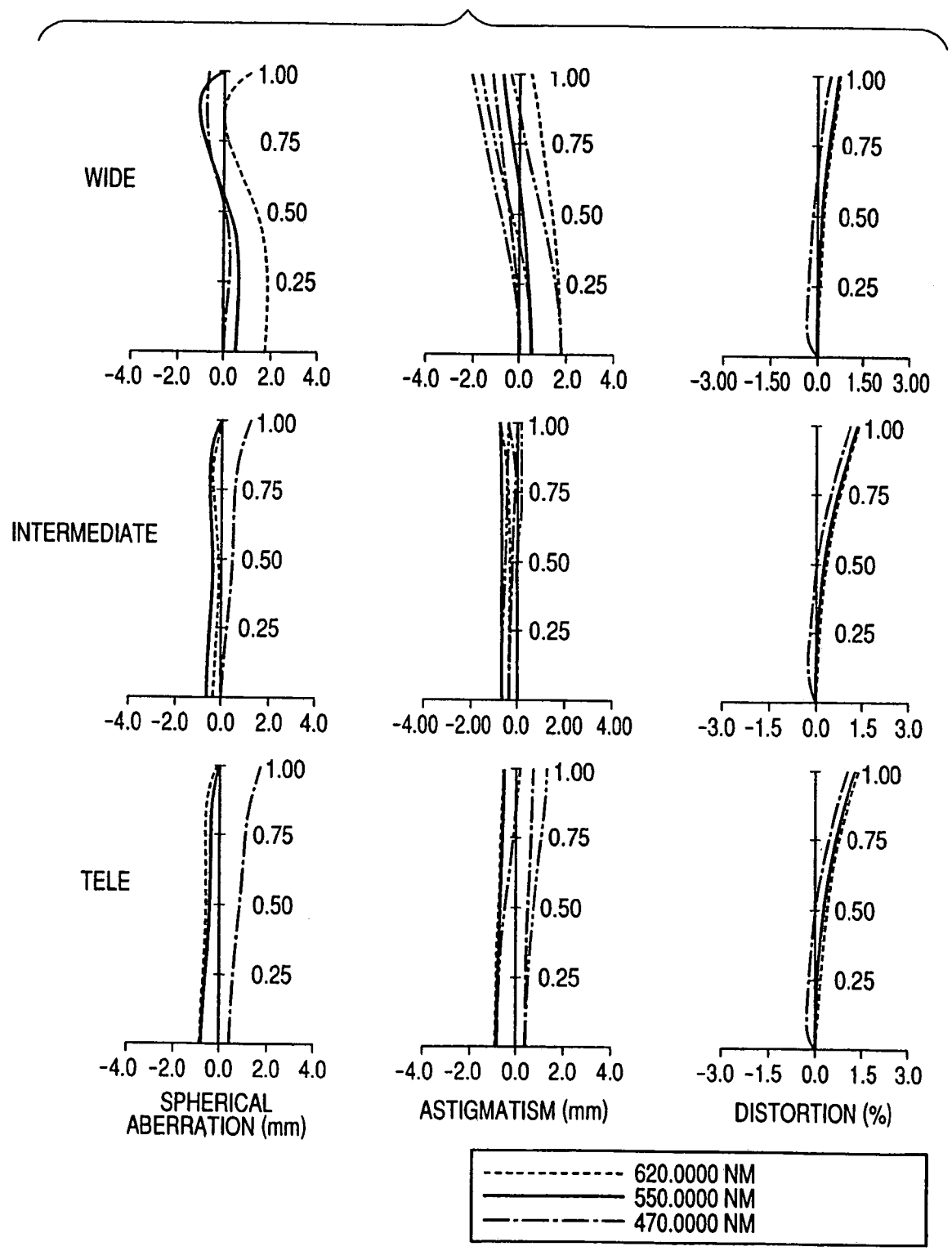
FIG. 8 is a longitudinal aberration diagram in a numerical embodiment 2 of the present invention.

Further, FIG. 8 shows a longitudinal aberration diagram in the numerical embodiment 2. FIG. 8 is the longitudinal aberration diagram showing, in the order from the top, the longitudinal aberrations at the wide angle position (focal length: 77 mm), at the intermediate point (focal length: 109 mm) and at a telephoto position (focal length: 144 mm). Wavelengths of evaluation rays are 620 nm, 550 nm and 470 nm. It is recognized from FIG. 8 that the image is preferably formed.

As discussed above, the zoom optical system in each embodiment is the zoom optical system that ensures the space sufficient for inserting the color synthesizing member etc., and exhibits the excellent telecentricity on the object side and the excellent invariability of the positions of the object surface, the image plane and the exit pupil with respect to the fluctuations in the focal length.

Accordingly, when this zoom optical system is disposed on the side of the object surface of the projection optical system explained in the embodiment 1, it is possible to actualize the projection optical system and the image projecting apparatus, wherein the sensitivity to the manufacturing error is low, the aberrations can be preferably corrected though it is the wide view angle, and there is the large moving amount on the screen.

Note that the embodiments 1 and 2 have exemplified the zoom optical systems in which the diameter of the exit pupil differs in the Y-axis direction and in the X-axis direction, however, the present invention can be applied to a zoom optical system having the exit pupil of which the diameter is the same in both of these directions.

Here, the present invention is applicable also to a magnification length measuring machine.

Moreover, the embodiments discussed above have exemplified the zoom optical systems in which the object side is set as the reduction side, and the image side is set as the magnification side, however, the present invention can be applied also to a zoom optical system in which the object side is set as the magnification side, and the image side is set as the reduction side and to an optical apparatus using this zoom optical system. For example, the present invention can be applied to an exposure apparatus (if the reduction side is telecentric, a size of the image remains unchanged even when a focus position of the object on the reduction side slightly deviates) and a compact imaging lens including a front stop (the stop disposed on the magnification side of the zoom optical system).

Furthermore, a diffraction grating is provided on the lens surface, whereby the optical power may be acquired and the chromatic aberration may also be corrected.

According to the present embodiment, it is possible to actualize the compact zoom optical system that ensures the sufficient back-focus, provides the bright optical system with the large numerical aperture, and further exhibits the excellent telecentricity on the object side and the excellent invariability of the positions of the object surface, the image plane and the exit pupil with respect to the fluctuations in the focal length.

This application claims priority from Japanese Patent Application No. 2004-261716 filed Sep. 8, 2004, which is hereby incorporated by reference herein.

What is claimed is:

1. A zoom optical system, in order from a reduction side to a magnification side, comprising:
   a first lens unit having positive optical power;
   a second lens unit having the positive optical power;
   a third lens unit having negative optical power; and
   a fourth lens unit having the positive optical power,
   wherein respective intervals between said first, second, third and fourth lens units change during zooming,
   wherein a conjugate position on the magnification side with respect to a conjugate position on the reduction side, and a position of a pupil of the zoom optical system with respect to the conjugate position on the reduction side, are substantially fixed over an entire zooming range, and
   wherein during zooming from a wide angle end to a telephoto end, the fourth lens unit moves to the magnification side, and an interval between the first lens unit and the fourth lens unit increases.

2. A zoom optical system according to claim 1, wherein said pupil is disposed outside said zoom optical system.

3. A zoom optical system according to claim 2, wherein said pupil is disposed on the magnification conjugate side of said zoom optical system.

4. A zoom optical system according to claim 1, wherein a position of said first lens unit at the telephoto end is closer to the reduction side than a position of the first lens unit at the wide angle end.

5. A zoom optical system according to claim 1, wherein a position of said lens unit on a most magnification side among said lens units at the telephoto end is closer to the magnification side than a position of the lens unit on a most magnification side at the wide angle end.

6. A zoom optical system according to claim 1, wherein an interval between said first lens unit and said second lens unit at the telephoto end is wider than an interval between the first lens unit and the second lens unit at the wide angle end.

7. A zoom optical system according to claim 1, wherein an interval between said second lens unit and said third lens unit at the telephoto end is narrower than an interval between the second lens unit and the third lens unit at the wide angle end, and an interval between the third lens unit and said fourth lens unit at the telephoto end is wider than an interval between the third lens unit and the fourth lens unit at the wide angle end.

8. A zoom optical system according to claim 1, wherein the zoom optical system is substantially telecentric on the reduction conjugate side, and a distance from the image side principal point to the pupil is substantially equal to the focal length of the zoom optical system over the entire zooming range.

9. A zoom optical system according to claim 1, wherein over said entire zooming range, a distance from the reduction conjugate side principal point to the magnification conjugate side principal point is substantially equal to a value given by:

$$E-fz-(x'+fz)/x'$$

where E is a distance from the reduction side conjugate position to the magnification side conjugate position, fz is a focal length of the zoom optical system, and x' is a distance from the pupil to the magnification side conjugate position.

10. A zoom optical system according to claim 1, wherein a distance from said fourth lens unit to the pupil is longer than ½ of the minimum diameter of the pupil over the entire zooming range.

11. A projection optical system, comprising:
a zoom optical system according to claim 1,
wherein a light beam from an original disposed in the reduction conjugate position is projected onto a surface to be projected.

12. A projection optical system comprising:
a zoom optical system according to claim 1;
a reflecting member disposed substantially at a position of the pupil and reflecting the light from said zoom optical system; and
a reflection optical system including a plurality of reflecting surfaces that sequentially reflect the light from said reflecting member,
wherein a light beam incident on said zoom optical system from an original disposed in the reduction conjugate position, is projected onto a surface to be projected by said reflection optical system, and
a projection image projected on the surface to be projected moves on the surface to be projected by rotating said reflecting member.

13. A projection optical system according to claim 12, wherein said reflection optical system includes a plurality of non-rotation symmetrical reflecting surfaces.

14. A projection optical system according to claim 12, wherein an intermediate image of the original is formed in an interior of said reflection optical system.

15. A projection optical system according to claim 12, further comprising at least one refracting optical element disposed between said reflection optical system and the surface to be projected.

16. A projection optical system according to claim 15, wherein said at least one refracting optical element includes a cemented lens of a positive lens and a negative lens.

17. An image projecting apparatus comprising:
a projection optical system according to claim 12; and
an image forming element forming the original.

18. An image projecting apparatus according to claim 17, wherein a distance from the reduction side conjugate position to said first lens unit is equal to or more than 3 times as large as the maximum height of the original over the entire zooming range.

19. An image projecting system, comprising:
an image projecting apparatus according to claim 17; and
an image information supplying apparatus for supplying said image projecting apparatus with image information for forming the original.

20. An optical apparatus, comprising a zoom optical system according to claim 1.

21. A projection optical system comprising:
a zoom optical system, in order from a reduction side to a magnification side, comprising:
a first lens unit having positive optical power;
a second lens unit having the positive optical power; and
a third lens unit having the positive optical power,
wherein respective intervals between the first, second and third lens units change during zooming,
wherein a conjugate position on the magnification side with respect to a conjugate position on the reduction side, and a position of a pupil of the zoom optical system with respect to the conjugate position on the reduction side, are substantially fixed over an entire zooming range,
wherein during zooming from a wide angle end to a telephoto end, the third lens unit moves-close to the magnification side, and an interval between the first lens unit and the third lens unit increases, and
wherein an interval between the second lens unit and the third lens unit at the telephoto end is narrower than an interval between the second lens unit and the third lens unit at the wide angle end;
a reflecting member disposed substantially at a position of the pupil and reflecting the light from the zoom optical system; and
a reflection optical system including a plurality of reflecting surfaces that sequentially reflect the light from the reflecting member,
wherein a light beam incident on the zoom optical system from an original disposed in the reduction conjugate position, is projected onto a surface to be projected by the reflection optical system, and
a projection image projected on the surface to be projected moves on the surface to be projected by rotating the reflecting member.

22. A projection optical system according to claim 21, wherein said reflection optical system includes a plurality of non-rotation symmetrical reflecting surfaces.

23. A projection optical system according to claim 21, wherein an intermediate image of the original is formed in an interior of said reflection optical system.

24. A projection optical system according to claim 21, further comprising at least one refracting optical element disposed between said reflection optical system and the surface to be projected.

25. A projection optical system according to claim 24, wherein said at least one refracting optical element includes a cemented lens of a positive lens and a negative lens.

26. An image projecting apparatus, comprising:
a projection optical system according to claim 21; and
an image forming element forming the original.

27. An image projecting apparatus according to claim 26, wherein a distance from the reduction side conjugate position to said first lens unit is equal to or more than 3 times as large as the maximum height of the original over the entire zooming range.

28. An image projecting system, comprising:
an image projecting apparatus according to claim 26; and
an image information supplying apparatus for supplying the image projecting apparatus with image information for forming the original.

* * * * *

UNITED STATES PATENT AND TRADEMARK OFFICE
CERTIFICATE OF CORRECTION

PATENT NO. : 7,295,378 B2
APPLICATION NO. : 11/220736
DATED : November 13, 2007
INVENTOR(S) : Hakko et al.

It is certified that error appears in the above-identified patent and that said Letters Patent is hereby corrected as shown below:

Column 23, Line 4, change "E-fz-(x`+fz)/x`" should be changed to -- E-fz-fz(x`+fz)/x` --.

Signed and Sealed this

Eighth Day of April, 2008

JON W. DUDAS
*Director of the United States Patent and Trademark Office*